US012753783B2

(12) United States Patent
Juhl et al.

(10) Patent No.: US 12,753,783 B2
(45) Date of Patent: Oct. 6, 2026

(54) MULTIPLE INPUT MULTIPLE OUTPUT PHONONIC SUBSURFACES FOR PASSIVE BOUNDARY LAYER TRANSITION DELAY

(71) Applicant: Government of the United States as represented by the Secretary of the Air Force, Wright-Patterson AFB, OH (US)

(72) Inventors: Abigail Juhl, Bellbrook, OH (US); Caleb Barnes, Cedarville, OH (US); Carson Willey, Beavercreek, OH (US); Vincent Chen, Dayton, OH (US); Alberto Medina, Fairborn, OH (US); Kevin Rosenberg, Washington, DC (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 15 days.

(21) Appl. No.: 18/664,055

(22) Filed: May 14, 2024

(65) Prior Publication Data

US 2025/0180044 A1 Jun. 5, 2025

Related U.S. Application Data

(60) Provisional application No. 63/513,408, filed on Jul. 13, 2023.

(51) Int. Cl.
*F15D 1/00* (2006.01)
*B06B 1/18* (2006.01)

(52) U.S. Cl.
CPC .............. *F15D 1/006* (2013.01); *B06B 1/183* (2013.01)

(58) Field of Classification Search
CPC .......... F15D 1/00; F15D 1/0005; F15D 1/002; F15D 1/0025; F15D 1/003; F15D 1/006;
(Continued)

(56) References Cited

U.S. PATENT DOCUMENTS 8,196,863 B2 * 6/2012 Couffignal ................ B64C 5/18 244/87
8,876,064 B2 * 11/2014 Seifert .................. B64C 21/025 244/209

(Continued)

OTHER PUBLICATIONS

Barnes, Caleb J. et al., "Initial Computational Investigation Toward Passive Transition Delay Using a Phononic Subsurface"; AIAA SciTech 2021 Forum; Jan. 11-15 & 19-21, 2021; Published Online: Jan. 4, 2021; https://doi.org/10.2514/62021-1454.

(Continued)

*Primary Examiner* — Joshua E Rodden
(74) *Attorney, Agent, or Firm* — AFMCLO/JAZ; John T. Addicks

(57) ABSTRACT

A multi-input, multi-output phononic system including a first interface surface and a second interface surface that respond to at least one of a pressure gradient or a velocity gradient in a wave of a turbulent fluid flow or a laminar fluid flow, the pressure gradient or the velocity gradient associated with complex motion of the flow exhibiting a plurality of frequencies exerted on one or more of the interface surfaces; and a subsurface feature extending from the interface surfaces, the subsurface feature comprising a phononic crystal or locally resonant metamaterial adapted to receive one or more of the pressure gradient or the velocity gradient from the fluid flow via the interface surfaces and to alter one or more of a phase and an amplitude of a plurality of frequency components of the fluid flow.

15 Claims, 16 Drawing Sheets

(58) Field of Classification Search
CPC .......... F15D 1/0065; F15D 1/007; F15D 1/10; F15D 1/12; B06B 1/183
USPC .......................................................... 244/204
See application file for complete search history.

(56) References Cited

U.S. PATENT DOCUMENTS

| | | | | |
|---|---|---|---|---|
| 9,410,873 | B2 * | 8/2016 | Wilson | B01L 3/50273 |
| 9,422,954 | B2 * | 8/2016 | Van Buren | F15D 1/007 |
| 10,830,262 | B2 | 11/2020 | Hussein et al. | |
| 11,118,613 | B2 | 9/2021 | Hussein et al. | |
| 11,453,482 | B2 * | 9/2022 | Rubin | B64C 23/005 |
| 11,519,433 | B2 * | 12/2022 | Wine | F15D 1/12 |
| 2016/0097410 | A1 | 4/2016 | Hussein et al. | |
| 2018/0023599 | A1 * | 1/2018 | Hussein | G10K 11/162 137/1 |
| 2022/0290700 | A1 | 9/2022 | Hussein et al. | |
| 2022/0290701 | A1 * | 9/2022 | Hussein | B32B 15/20 |

OTHER PUBLICATIONS

Beam, Richard M. et al., "An Implicit Factored Scheme for the Compressible Navier-Stokes Equations"; AIAA Journal, vol. 16, No. 4, Apr. 1978, pp. 393-402; Published Online: May 17, 2012, https://doi.org/10.2514/3.60901.

Bechert, D.W. et al., "Experiments on drag-reducing surfaces and their optimization with an adjustable geometry"; J. Fluid Mech. (1997), vol. 338, pp. 59-87; Published online by Cambridge University Press: May 10, 1997, https://doi.org/10.1017/S0022112096004673.

Boashash, Boualem., "Estimating and Interpreting the Instantaneous Frequency of a Signal—Part 1: Fundamentals"; Proceedings of the IEEE, vol. 80, No. 4, Apr. 1992, pp. 520-538.

Callanan, J. et al., "Uncovering low frequency band gaps in electrically resonant metamaterials through tuned dissipation and negative impedance conversion"; Published 2022 Smart Mater. Struct 31 015002; Sep. 29, 2021.

Carpenter, Peter W. et al., "Process on the Use of Compliant Walls for Laminar-Flow Control"; Journal of Aircraft; vol. 38, No. 3, May-Jun. 2001, pp. 504-512.

Carpenter, Peter W. et al., "The hydrodynamic stability of flow over Kramer-type compliant surfaces. Part 1. Tollmien-Schlichting instabilities"; J. Fluid Mech. (1985), vol. 155, pp. 465-510; Printed in Great Britain.

Choi, Kwing-So; "European drag-reduction research—recent developments and current status"; Fluid Dynamics Research, 26, (2000), pp. 325-335; http://www.iop.org/journals/FDR.

Chung, Yonggmann M. et al; "Effectiveness of active flow control for turbulent skin friction drag reduction"; American Institute of Physics, Physics of Fluids 23, 025102 (2011).

Gaitonde, Datta V. et al; "High-Order Schemes for Navier-Stokes Equations: Algorithm and Implementation into FDL3DI"; AFRL-VA-WP-TR-1998-3060; Aug. 1998.

Gaitonde, Datta V. et al; "Further Development of a Navier-Stokes Solution Procedure Based on Higher-Order Formulas"; AIAA Meeting Paper, 37th Aerospace Sciences Meeting and Exhibit, Jan. 11, 1999-Jan. 14, 1999, Reno, NV, USA; Published Online: Aug. 22, 2012; https://doi.org/10.2514/6.1999-559.

Garmann, Daniel J. et al; "Comparative study of implicit and subgrid-scale model large-eddy simulation techniques for low-Reynolds number airfoil application"; International Journal for Numerical Methods in Fluids, Int. J. Numer. Meth. Fluids 2013; 71: 1546-1565; Published online Aug. 23, 2012 in Wiley Online Library (wileyonlinelibrary.com/journal/nmf). doi: 10.1002/fld. 3725.

Georgiadis, Nicholas J. et al; "Large-Eddy Simulation: Current Capabilities, Recommended Practices, and Future Research"; AIAA Meeting Paper, 47th Aerospace Sciences Meeting including The new Horizons Forum and Aerospace Exposition, Jan. 5, 2009-Jan. 8, 2009, Orlando, FL, USA; Published Online: Jun. 15, 2012; https://doi.org/10.2514/6.2009-948.

Golovin, Kevin B. et al; "Bioinspired surfaces for turbulent drag reduction"; Philosophical Transactions of the Royal Society A, vol. 374, Issue 2073; Published: Aug. 6, 2016; https://doi.org/10.1098/rsta.2016.0189.

Gordnier, R.E. et al; "Development of a Three-Dimensional Viscous Aeroelastic Solver for nonlinear Panel Flutter"; Journal of Fluids and Structures (2002) 16(4), 497-527; https://doi.org/10.1006/jfls.2000.0434.

Grundmann, Sven et al; "Experimental damping of boundary-layer oscillations using DBD plasma actuators"; International Journal of Heat and Fluid Flow 30 (2009) 394-402.

Haller, D. et al; "Cymbal Type Piezo-Polymer-Composite Actuators for Active Cancellation of Flow Instabilities on Airfoils"; (2011); 16th International Solid-State Sensors, Actuators and Microsystems Conference, Beijing, China, 2011, pp. 494-497; doi: 10.1109/TRANSDUCERS.2011.5969617.

Hussein, Mahmoud I. et al; "Dynamics of Phononic Materials and Structures: Historical Origins, Recent Progress, and Future Outlook"; Jul. 2014; Applied Mechanics Reviews, vol. 66 pp. 040802-1-040802-38; https://doi.org/10.1115/1.4026911.

Hussein, Mahmoud I. et al.; "Flow stabilization by subsurface phonons"; Proceedings of the Royal Society A; May 2015, vol. 471, Issue 2177, Sep. 28, 2014; https://doi.org/10.1098/rspa.2014.0928.

Kumar, Sanjay et al; "Recent Advances in Active Acoustic Metamaterials"; International Journal of Applied Mechanics, vol. 11, No. 8; 2019; 1950081; doi: 10.1142/S1758825119500819.

Landahl, Marten T.; "On the stability of a laminar incompressible boundary layer over a flexible surface"; Journal of Fluid mechanics, 13(4), 609-632; 1962; doi: 10.1017/S002211206200097X.

Liepmann, H.W. et al; "Control of laminar-instability waves using a new technique"; Journal of Fluid Mechanics, 118, 187-200; 1982; doi: 40.1017/S0022112082001025; https://doi.org/10.1017/S0022112082001025.

Lele, Sanjiva K.; "Compact Finite Difference Schemes with Spectral-like Resolution"; Journal of Computational Physics 103, 16-42; 1992.

Liebeck, Robert H.; "Design of Subsonic Airfoils for High Lift"; J. Aircraft, vol. 15, No. 9, Sep. 1978; Published online May 22, 2012; http://arc.aiaa.org | DOI: 10.2514/3.58406.

Lu, Ming-Hui et al; "Phononic crystals and acoustic metamaterials"; Materialstoday, vol. 12, No. 12, pp. 34-42, Dec. 2009.

Luhar, M. et al; "A framework for studying the effect of compliant surfaces on wall turbulence"; Journal of Fluid Mechanics, 768, 415-441. doi: 10.1017/jfm.2015.85; 2015; Published online Mar. 10, 2015, https://doi.org/10.1017/jfm.2015.85.

Luo, Yuehao et al; "Advances of drag-reducing surface technologies in turbulence based on boundary layer control"; ScienceDirect, Journal of Hydrodynamics, 27(4):473-48; 2015; doi: 10.1016/S1001-6058(15)60507-8; www.sciencedirect.com/science/journal/10016058.

Luo, Yuehao; "Recent Progress in Exploring Drag Reduction Mechanism of Real Sharkskin Surface: A Review": Journal of Mechanics in Medicine and Biology, vol. 15, No. 3 1530002, 2015; doi:10.1142/S0219519415300021.

Mahfoze, O. et al; "Skin-friction drag reduction in a channel flow with streamwise-aligned plasma actuators"; International Journal of Heat and Fluid Flow 66, pp. 83-94; 2017; http://dx.doi.org/10.1016/j.ijheatfluidflow.2017.05.013.

Maldovan, Martin; "Sound and heat revolutions in phononics"; vol. 503, Nature, 209, Nov. 14, 2013; doi: 10.1038/nature12608.

Morton, Scott A. et al; "Accuracy and Coupling Issues of Aeroelastic Navier-Stokes Solutions on Deforming Meshes"; AIAA Meeting Paper; 38th Structures, Structural Dynamics, and materials Conference; Apr. 7, 1997-Apr. 10, 1997, Kissimmee, FL.; Published Online: Aug. 22, 2012; https://doi.org/10.2514/6.1997-1085.

Nagy, Peter T. et al; "The effect of spanwise and streamwise elastic coating on boundary layer transition"; Journal of Fluids and Structures 110 (2022) 103521 ; https://doi.org/10.1016/j.jfluidstructs.2022.103521.

(56) References Cited

OTHER PUBLICATIONS

Pfister J. et al; "Global stability and resolvent analyses of laminar boundary-layer flow interacting with viscoelastic patches"; (2022); Journal of Fluid Mechanics, vol. 937, A1; https://doi.org/10.1017/jfm.2022.72.

Phani, A. Srikantha et al; "Wave propagation in two-dimensional periodic lattices"; Accoustical Society of America, vol. 119, No. 4 pp. 1995-2005, (Apr. 2006); https://doi.org/10.1121/1.2179748.

Pierce, Connor D. et al; "Adaptive elastic metastructures from magneto-active elastomers"; Smart Materials and Structures, vol. 29, No. 6 (2020); https://doi.org/10.1088/1361-665X/ab80e4.

Pulliam, T.H. et al; "A Diagonal Form of an Implicit Approximate-Factorization Algorithm"; Journal of Computational Physics vol. 39, Issue 2, pp. 347-363 (1981); https://doi.org/10.1016/0021-9991(81)90156-X.

Rastegari, Amirreza et al; "The common mechanism of turbulent skin-friction drag reduction with superhydrophobic longitudinal microgrooves and riblets"; Journal of Fluid Mechanics, (2018), vol. 838, pp. 68-104 ; https://doi.org/10.1017/jfm.2017.865.

Rizzetta, Donald P. et al; "Direct Numerical Simulation of Transition Control via Local Dynamic Surface Modification"; AIAA Aviation Forum, 2018 Flow Control Conference, Jun. 25-29, 2019, Atlanta, GA; Published Online: Jun. 25-29, 2018; https://doi.org/10.2514/6.2018-3211.

Rizzetta, Donald P. et al; "Numerical Investigation of Transition Delay by dynamic Surface Deformation"; AIAA SciTech Forum, Jan. 7-11, 2019, San Diego, CA; Published Online Jan. 6, 2019; https://doi.org/10.2514/6.2019-1140.

Rizzetta, Donald P. et al; "Closed-Loop Control of Transition by Local Dynamic Surface Modification"; AIAA SciTech Forum, Jan. 6-10, 2020, Orlando, FL; Published Online Jan. 5, 2020; https://doi.org/10.2514/6.2020-0096.

Rizzetta, Donald P. et al; "Investigation of Transition Delay on a Wing Section by Dynamic Surface Deformation"; AIAA Journal, vol. 59, No. 9, Sep. 2021; Published Online May 7, 2021; https://doi.org/10.2514/1.J060365.

Visbal, Miguel R. et al; "Large-Eddy Simulation on Curvilinear Grids Using Compact Differencing and Filtering Schemes"; Journal of Fluids Engineering 2002; https://doi.org/10.1115/1.1517564.

Saravi, S.S. et al; "A Review of Drag Reduction by Riblets and Micro-Textures in the Turbulent Boundary Layers"; European Scientific Journal, Nov. 2013 Edition , vol. 9, No. 33; ISSN: 1857-7881 (Print) e-ISSN 1857-7431.

Schubauer, G.B. et al; "Laminar Boundary-Layer Oscillations and Stability of Laminar Flow"; Journal of the Aeronautical Sciences, vol. 14, No. 2, Feb. 1947; Published Online Aug. 30, 2012; https://doi.org/10.2514/8.126.

Seifert, A. et al.; "Use of Piezoelectric Actuators for Airfoil Separation Control"; AIAA Journal, vol. 36, No. 8, Aug. 1998; Published Online May 17, 2012; https://doi.org/10.2514/2.549.

Sen, P.K., et al; "On the stability of laminar boundary-layer flow over a flat plate with a compliant surface"; Journal of Fluid Mechanics (1988), vol. 197, pp. 201-240; https://doi.org/10.1017/S0022112088003234.

Soleimani, Shima, et al; "A review of drag reduction and heat transfer enhancement by riblet surfaces in closed and open channel flow"; International Journal of Thermofluids, vol. 9, Feb. 2021, 100053; https://doi.org/10.1016/j.ijft.2020.100053.

Konstantinos, Tsigklifis, et al; "The interaction of Blasius boundary-layer flow with a compliant panel: flobal, local and transient analyses"; Journal of Fluid Mechanics (2017), vol. 827, pp. 155-193; https://doi.org/10.1017/jfm.2017.453.

Visbal, Miguel R. et al; "High-Order-Accurate Methods for Complex Unsteady Subsonic Flows"; AIAA Journal, vol. 37, No. 10, Oct. 1999; Published Online May 17, 2012; https://doi.org/10.2514/2.591.

Visbal, Miguel R. et al; An Implicit LES Approach Based on High-Order Compact Differencing and Filtering Schemes (Invited); 16th AIAA Computational Fluid Dynamics Conference, Jun. 23-26, 2003, Orlando, FL; https://doi.org/10.2514/6.2003-4098.

Willey, Carson L. et al; Coiled Phononic Crystal with Periodic Rotational Locking: Subwavelength Bragg Band Gaps; Physical Review Applied, vol. 18, Issue 1, Jul. 2022 Published Jul. 15, 2022; https://doi.org/10.1103/PhysRevApplied.18.014035.

Willey, Carson L. et al; Multi-input multi-output phononic subsurfaces for passive boundary layer transition delay; Journal of Fluids and Structures, vol. 121, Aug. 2023, 103936; https://doi.org/10.1016/j.jfluidstructs.2023.103936.

Zhang, Lu et al; "Active Control for Wall Drag Reduction: Methods, Mechanisms and Performance"; IEEE Access, vol. 8, pp. 7039-7057, 2020, https://doi.org/10.1109/ACCESS.2020.2963843.

* cited by examiner

MULTIPLE INPUT MULTIPLE OUTPUT PHONONIC SUBSURFACES FOR PASSIVE BOUNDARY LAYER TRANSITION DELAY

RIGHTS OF THE GOVERNMENT

The invention described herein may be manufactured and used by or for the Government of the United States for all governmental purposes without the payment of any royalty.

CROSS REFERENCE TO OTHER APPLICATIONS

Pursuant to 37 C.F.R. § 1.78(a)(4), this application claims the benefit of and priority to prior filed co-pending Provisional Application Ser. No. 63/513,408, filed Jul. 13, 2023, the entirety of which is incorporated herein by reference.

FIELD OF THE INVENTION

The present invention relates generally to systems and methods for reducing skin friction of a surface and, more particularly, to systems and methods for reducing skin friction of a surface using multi-input, multi-output phononic subsurfaces for passive boundary layer transition delay.

BACKGROUND OF THE INVENTION

Skin friction drag is caused by the frictional resistance of an object moving through a fluid, and it is responsible for billions of dollars in energy costs each year. Understanding fluid-solid interactions and developing methods to reduce skin friction drag would lead to a reduction in energy consumption for the gas, aerospace, and shipping industries. With a focus on aerospace applications, both active and passive flow control methods have generally been proposed. Some passive approaches include contouring airfoils, adding riblets or dimples, using super hydrophobic surfaces, including micro/nano morphologies, or coating with compliant surfaces. While passive techniques can be relatively simple to implement, their drag reduction effectiveness can be quite modest and limited to specific flight conditions.

Alternatively or additionally, active approaches can be implemented. Active approaches can significantly delay a transition from laminar to turbulent flow along a surface and can thus decrease fuel costs in a variety of flight conditions. But active methods may require some type of energy input and higher maintenance costs. These inputs and costs can outweigh any benefit received from the active approach. Some active approaches include acoustic wave generation, piezoelectric actuators, periodic surface heating and cooling, wall blowing or sucking, or plasma actuators. Because of the potential inefficiencies of these active methods, though, it is highly desired to find a low-maintenance passive flow control method that provides a discernible transition delay in many different operating environments.

Passive flow control methods using phononic crystals (PnC) have been described. PnC can be formed by periodically alternating layers of materials that have a high contrast in mechanical impedance. Bragg diffraction from the PnC architecture, causes the formation of phononic band gaps, which are frequency bands where elastic or acoustic waves cannot propagate within the PnC. Passbands exist between the band gaps, defining frequency bands where waves can propagate. By engineering the material properties and the geometric architecture of the PnC, it is possible to precisely design the dispersion of elastic/acoustic waves. With the ability to control waves, the PnC design was applied to the task of passively controlling wave-like sinusoidal fluctuations in the freestream velocity during subsonic flow, termed Tollmien-Schlichting (T-S) waves. The amplification of T-S waves can cause the boundary layer to transition from laminar to turbulent; so, being able to restrict the amplitude growth of the T-S waves with PnCs holds hope for delaying transition. This problem has been addressed by attaching a PnC to the fluid/solid interface of a channel flow. This arrangement has been termed a phononic subsurface (PSub). As shown in FIG. 1A, fluid can interact with the top surface of the PSub with the PSub attached in a manner that allows it to displace normal to the channel wall. Computationally, it has been demonstrated that a T-S wave incident on a PSub with an engineered band gap and truncation resonance, can cause an out-of-phase displacement of the PSub interface with the T-S wave forcing. The T-S wave forces the surface of the PSub, and the constitutive response of the PSub is to displace upwards into the flow and out-of-phase with the growing T-S wave. This PSub behavior can cause a local reduction in kinetic energy of the T-S wave at the location of the PnC. Because this passive PSub flow control occurs over a single interaction area of the fluid/solid interface, it can be termed a single input, single output (SISO) device. The single input being the T-S wave forcing and the single output the PSub displacement.

It is important to contrast the use of PSubs for flow control to that of a compliant surface, as it provides a significant motivation for further investigation. In 2001, it was reported that the use of compliant surfaces for aeronautical laminar flow control required that the magnitude of the wall and fluid inertias must match to have a significant effect on a T-S wave. To meet these criteria, air vehicle walls would be so weak that conventional forces of flight would destroy them. However, PnCs can be made of rigid materials (ABS plastic and aluminum) which are sufficiently strong to survive the forces of flight. In this work, inspiration is taken from previous research on compliant surfaces, and an approach is developed to realize transition delay with realistic materials for flight. It has been documented in literature that compliant patches can stabilize T-S waves via an irreversible energy transfer to the wall. It has also been shown that increasing the compliance of the wall is better for decreasing the growth of wave instabilities, but increasing the damping in the wall increases growth of the T-S waves. The problem with compliant patches is that the elastodynamic response of the patch is locked by the material properties. The benefit of using PSubs is that they can be composed of an assembly of parts, as shown in FIG. 1B and 1C, rather than a single or multiple slabs of material, which gives a greater ability to tailor the elastodynamic response and optimize the compliance and damping parameters. When a T-S wave interacts with the surface of a PSub, the PSub responds with a displacement of its interaction surface relative to the T-S wave, which can alter the amplitude of the growing instability. Another benefit of PSubs is that adaptive materials can be utilized to dynamically tune their properties in response to the flow environment; however, this would require active control, and here the sole focus is on passive control.

SUMMARY OF THE INVENTION

The present invention overcomes the foregoing problems and other shortcomings, drawbacks, and challenges described herein. While the invention will be described in connection with certain embodiments, it will be understood that the invention is not limited to these embodiments. To the contrary, this invention includes all alternatives, modifications, and equivalents as may be included within the spirit and scope of the present invention.

According to one embodiment shown and described herein, a multi-input, multi-output phononic system includes: a first interface surface and a second interface surface that respond to at least one of a pressure gradient or a velocity gradient in a wave of a turbulent fluid flow or a laminar fluid flow, the pressure gradient or the velocity gradient associated with complex motion of the flow exhibiting a plurality of frequencies exerted on one or more of the interface surfaces; and a subsurface feature extending from the interface surfaces, the subsurface feature comprising a phononic crystal or locally resonant metamaterial adapted to receive one or more of the pressure gradient or the velocity gradient from the fluid flow via the interface surfaces and to alter one or more of a phase and an amplitude of a plurality of frequency components of the fluid flow.

According to another embodiment shown and described herein, a method of controlling a flow includes providing a first interface surface and a second interface surface in a fluid flow along a flow structure, the fluid flow exhibiting turbulent or laminar flow characteristics, the first interface surface and the second interface surface arranged within the flow structure such that they each are exposed to one or more of a pressure gradient and a velocity gradient associated with complex motion of the fluid flow; and providing a subsurface feature extending from the interface surfaces, the subsurface feature comprising a phononic crystal or locally resonant metamaterial adapted to receive one or more of the pressure gradient or the velocity gradient from the fluid flow via the interface surfaces and to alter one or more of a phase and an amplitude of a plurality of frequency components of the fluid flow; and passively altering one or more of a phase or amplitude of a plurality of frequency components of the flow via the subsurface feature.

According to yet another embodiment, a system for reducing skin friction of a surface using multi-input, multi-output phononic subsurfaces for passive boundary layer transition delay includes: a first interface surface and a second interface surface that respond to at least one of a pressure gradient or a velocity gradient in a wave of a turbulent fluid flow or a laminar fluid flow, the pressure gradient or the velocity gradient associated with complex motion of the fluid flow exhibiting a plurality of frequencies exerted on one or more of the interface surfaces; and a subsurface feature comprising a plurality of masses extending from the interface surfaces, the subsurface feature adapted to receive one or more of the pressure gradient or the velocity gradient from the fluid flow via the interface surfaces and to passively alter one or more of a phase and an amplitude of a plurality of frequency components of the fluid flow.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

In this document, relational terms such as first and second, top and bottom, and the like may be used solely to distinguish one entity or action from another entity or action without necessarily requiring or implying any actual such relationship or order between such entities or actions. The terms “comprises,” “comprising,” “includes,” “including,” “has,” “having,” or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by “comprises . . . a” does not, without more constraints, preclude the existence of additional identical elements in the process, method, article, or apparatus that comprises the element.

Figure 1:
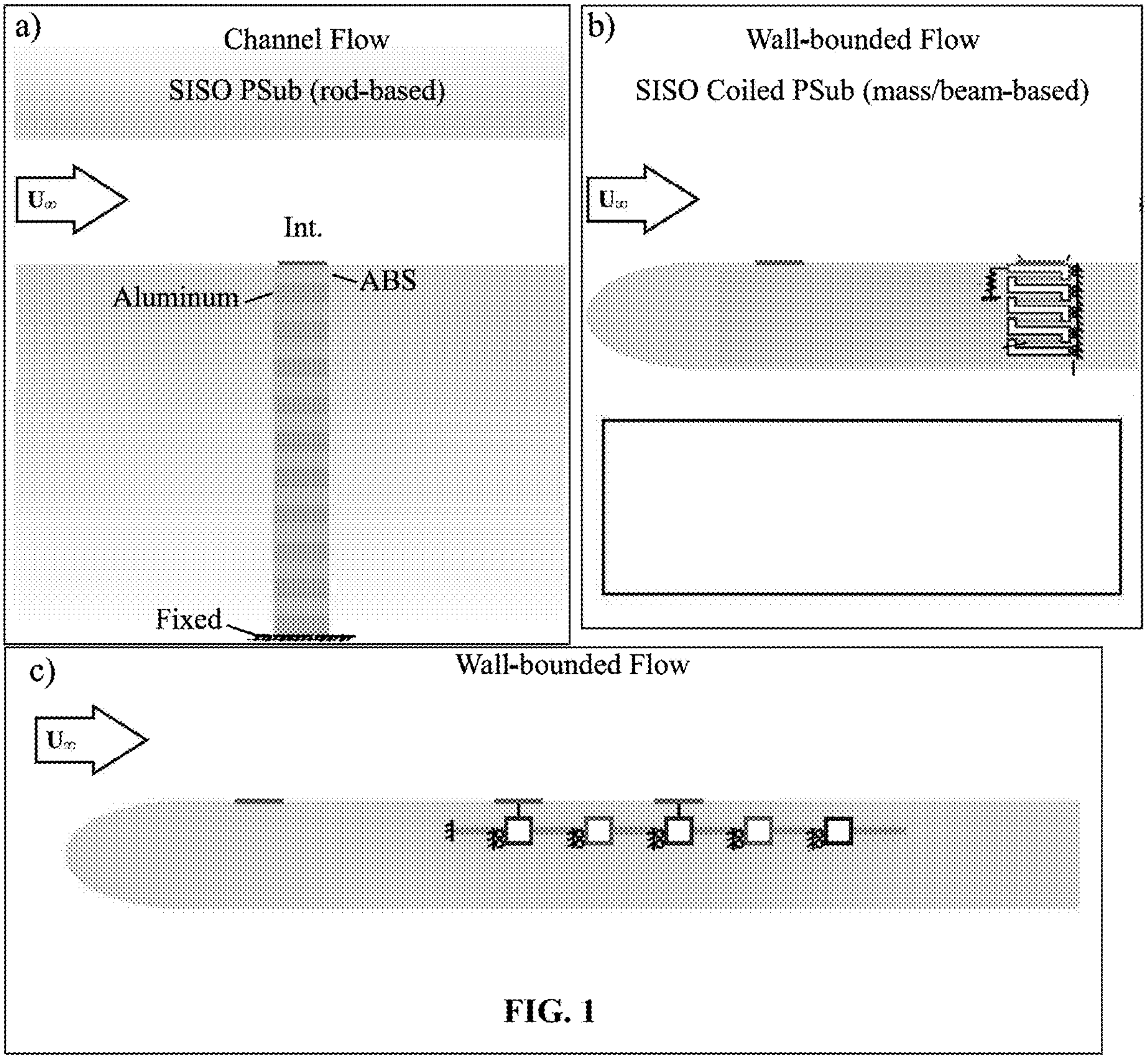

Reference throughout this document to “one embodiment,” “certain embodiments,” “an embodiment,” “implementation(s),” “aspect(s),” or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term “or” as used herein is to be interpreted as an inclusive or meaning any one or any combination. Therefore, “A, B or C” means “any of the following: A, B; C; A and B; A and C; B and C; A, B and C.” An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term “or” should generally be understood to mean “and/or” and so forth.

All documents mentioned herein are hereby incorporated by reference in their entirety. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words “about,” “approximately,” or the like, when accompanying a numerical value, are to be construed as indicating a deviation as would be appreciated by one of ordinary skill in the art to operate satisfactorily for an intended purpose. Ranges of values and/or numeric values are provided herein as examples only, and. do not constitute a limitation on the scope of the described embodiments. The use of any and all examples, or exemplary language (“e.g.,” “such as,” or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus and device may be used interchangeably in this text.

FIG. 1A presents a bimaterial rod-based SISO of the prior art, according to one or more embodiments shown or described herein.

FIG. 1B presents a coiled mass/beam-based SISO of the prior art.

FIG. 1C presents an extended mass/beam-based MIMO.

Figure 2:
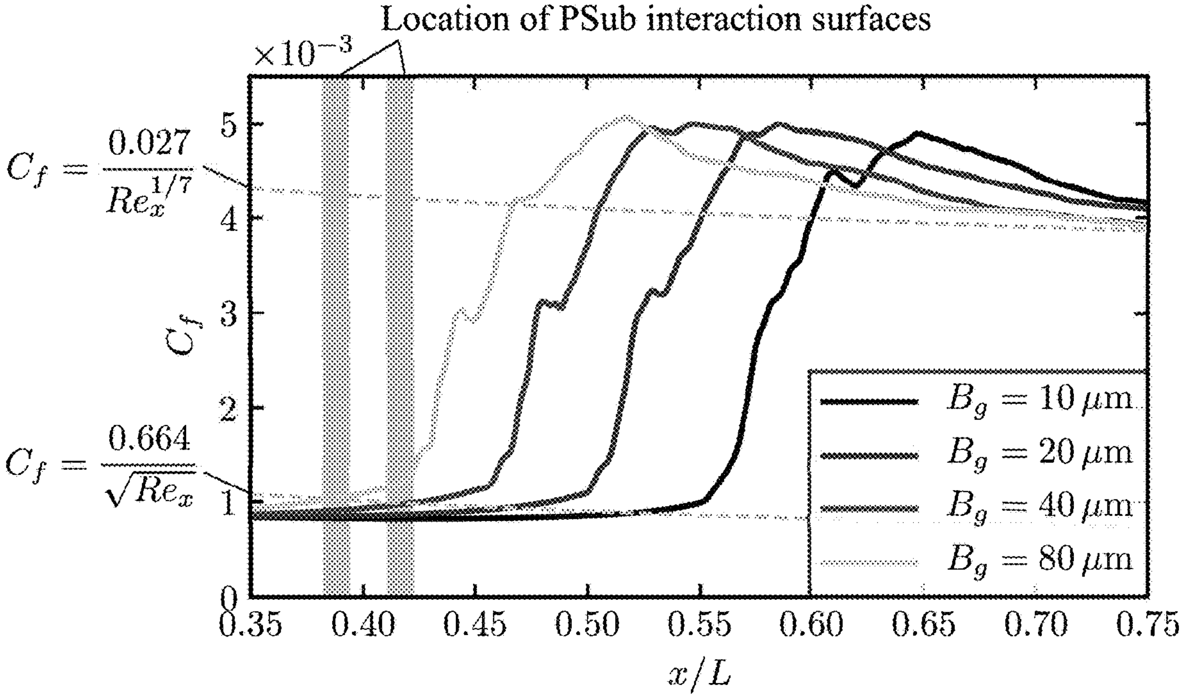

FIG. 2 presents skin friction coefficient at several generator amplitudes.

FIG. 3A presents a neutral curve for Blasius boundary layer in the √Rex-F plane.

FIG. 3B presents kinetic energy growth downstream of a generator (2D simulation, $B_g/L=2\times10^{-5}$).

Figure 4:

FIG. 4 presents a configuration for active control simulations.

Figure 5:
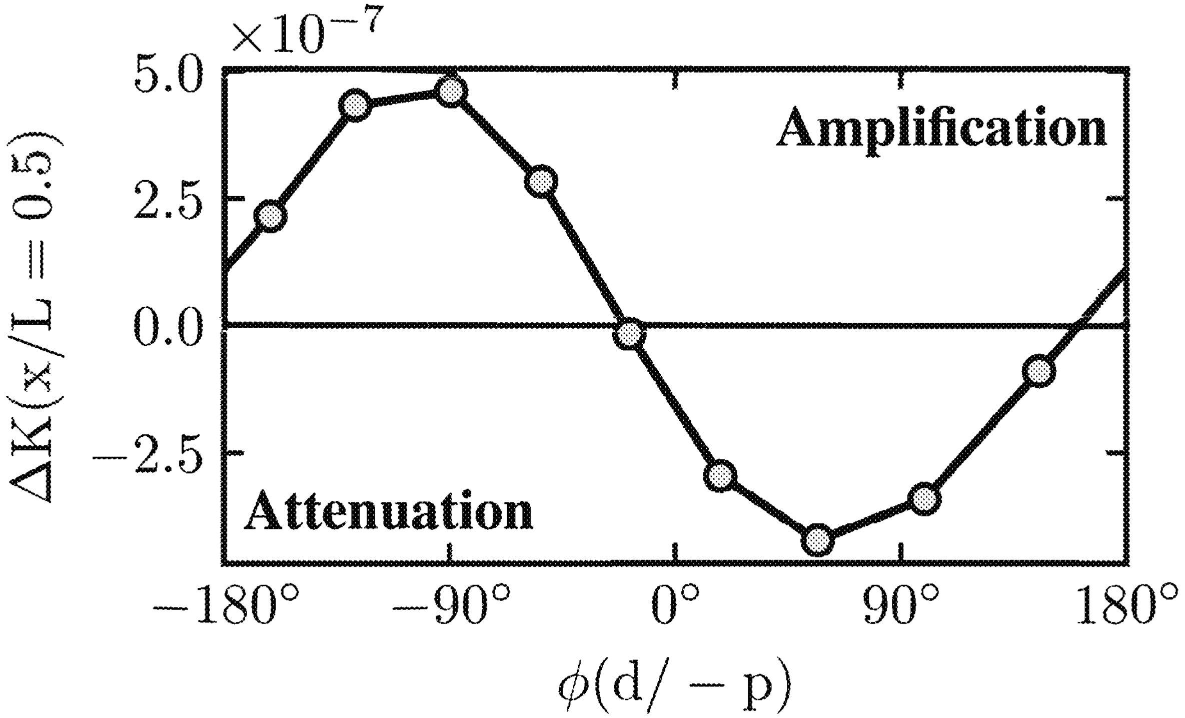

FIG. 5 presents AK vs. phase for two controller segments, $B_c=5$ μm.

Figure 6:
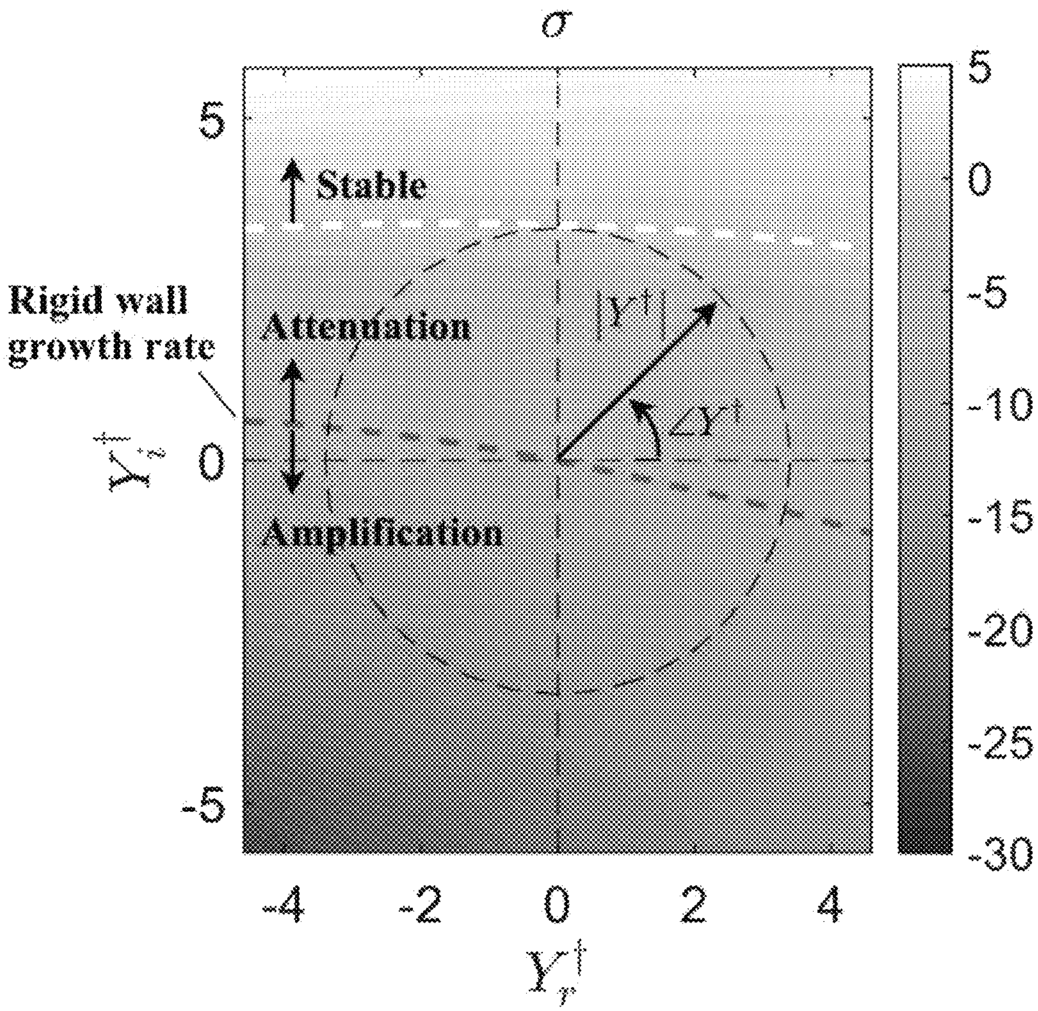

FIG. 6 presents spatial growth rate o as a function of Y†.

Figure 7:
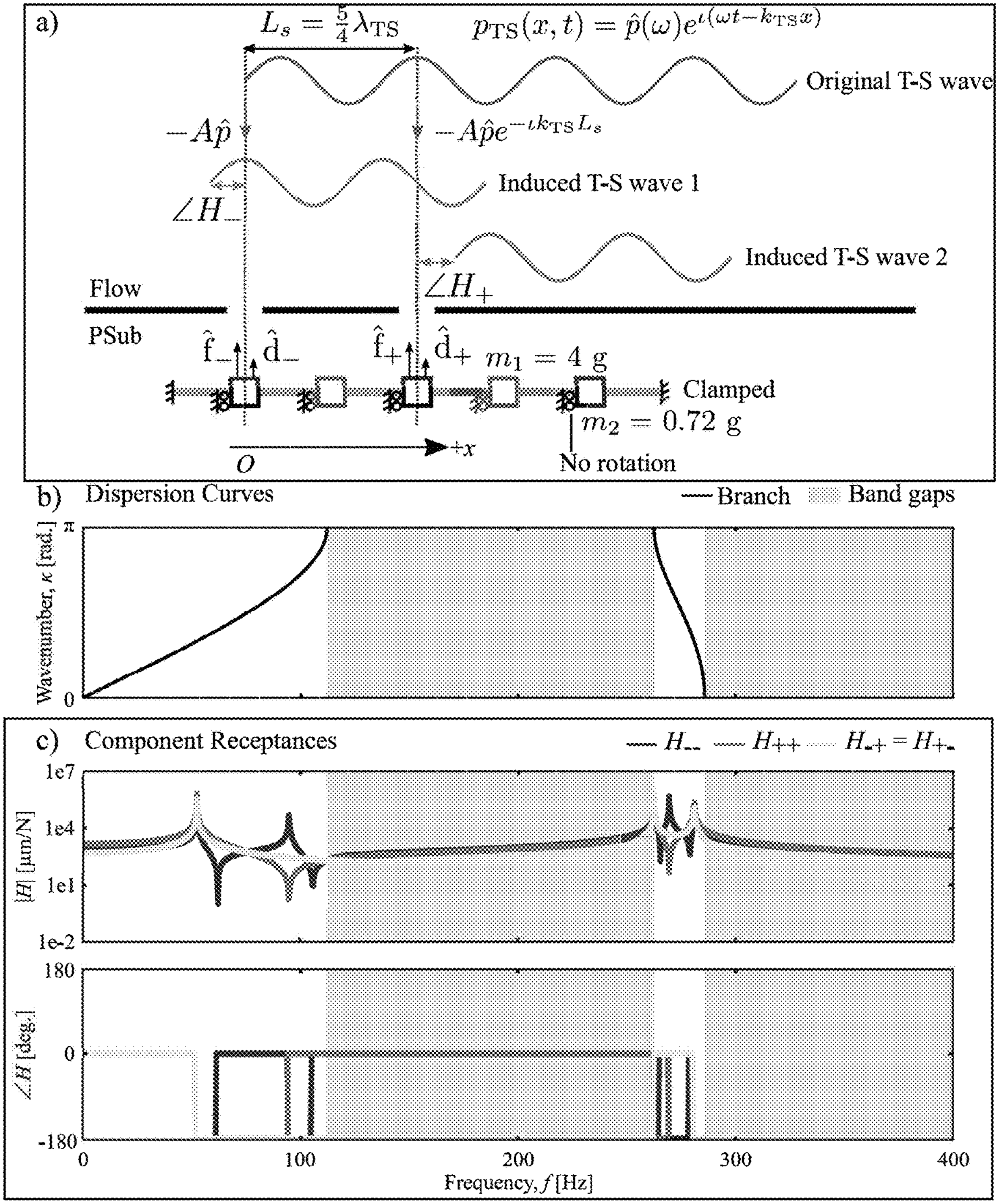

FIG. 7A illustrates how the first and third masses of the MIMO PSub react to original T-S wave pressure field, coupled through upstream (-) and downstream (+) interaction surfaces by displacing, thereby inducing additional T-S waves.

FIG. 7B illustrates that the induced T-S waves are dependent on the dispersion curves.

FIG. 7C illustrates that the induced T-S waves are dependent on the component receptances.

FIG. 7D illustrates a frequency of the T-S waves.

Figure 8:
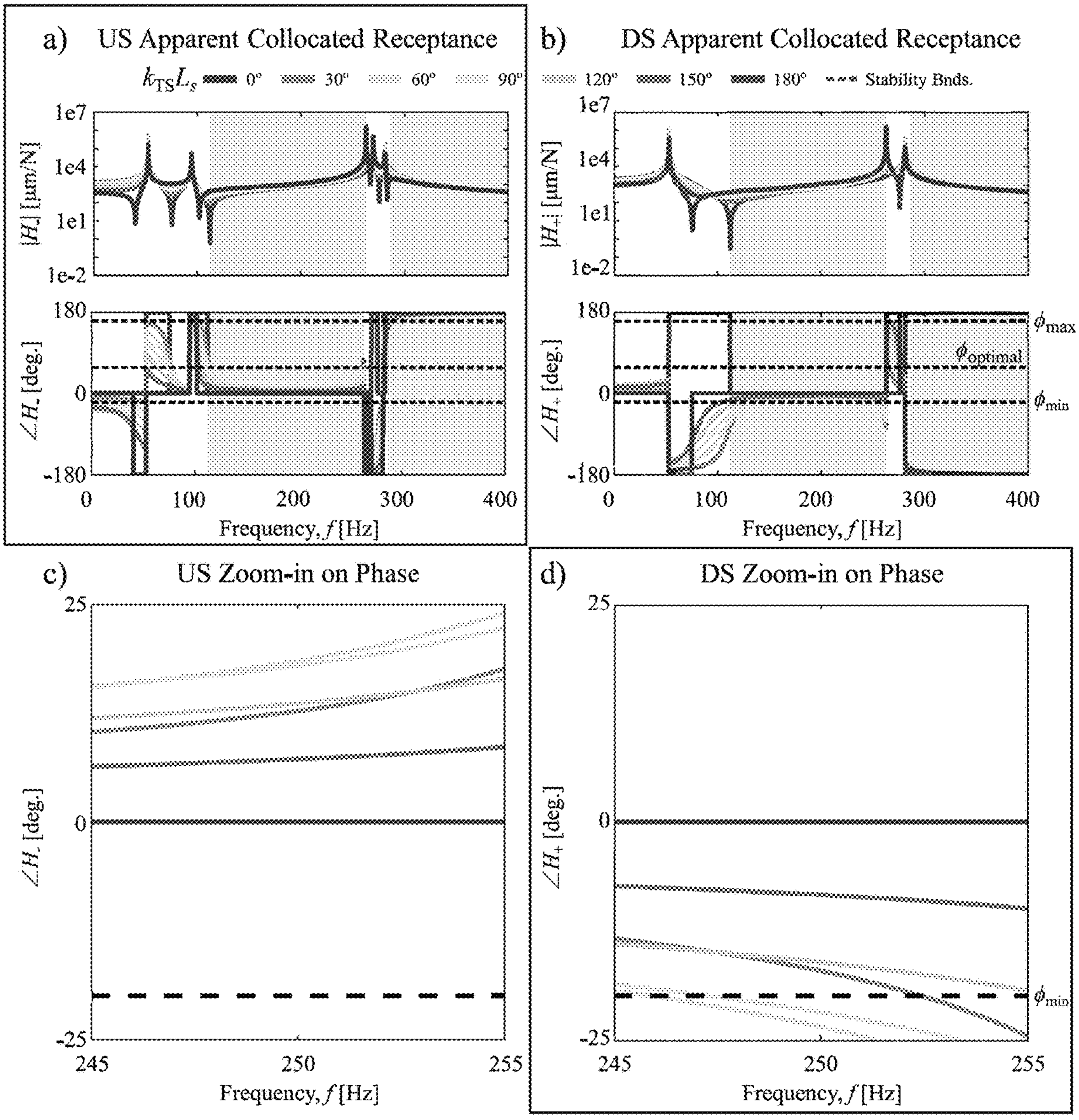

FIG. 8A illustrates an upstream apparent collocated receptance.

FIG. 8B illustrates a downstream apparent collocated receptance. These receptances may determine if the induced T-S waves will constructively or destructively interfere with the original T-S wave. Horizontal dashed lines in the phase panels are the boundaries of stability from Table 4 determined by CFD.

FIG. 8C illustrates a zoomed-in view of the phase panels.

FIG. 8D illustrates a zoomed-in view of the phase panels. These figures emphasize that stable frequency bands of phase are realized. Note, at 250 Hz and $K_{TS}L_s=90°$, phases are $\angle H\_=17.967°$ and $\angle H_+=-21.913°$.

Figure 9:
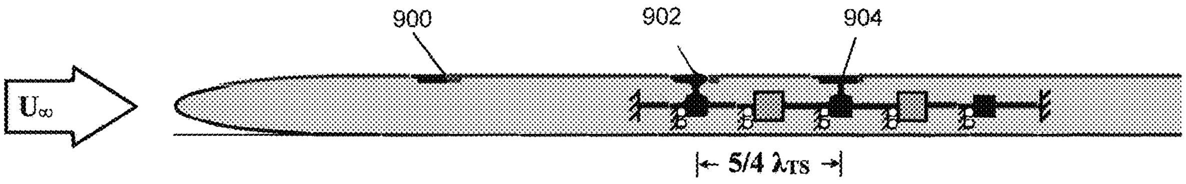

FIG. 9 presents a representative configuration for passive control simulations.

Figure 10:
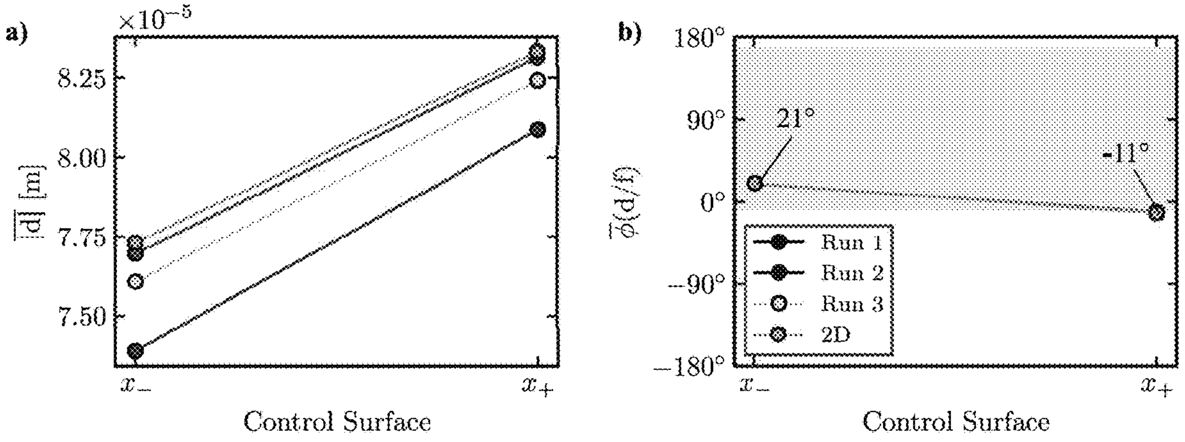

FIG. 10A presents amplitude for FSI surfaces alongside equivalent 2D simulation.

FIG. 10B presents phase for FSI surfaces alongside equivalent 2D simulation.

FIG. 11A presents an integrated TKE profile near PSub surfaces.

FIG. 11B presents an integrated TKE profile near skin friction profile, $C_f$.

Figure 12:
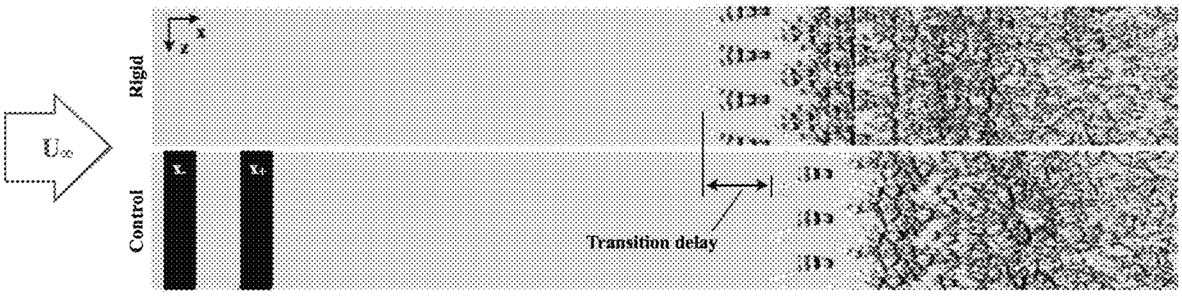

FIG. 12 presents a three-dimensional flow structure for rigid and controlled cases using an iso-surface of Q-criterion (Q=50).

Figure 13:
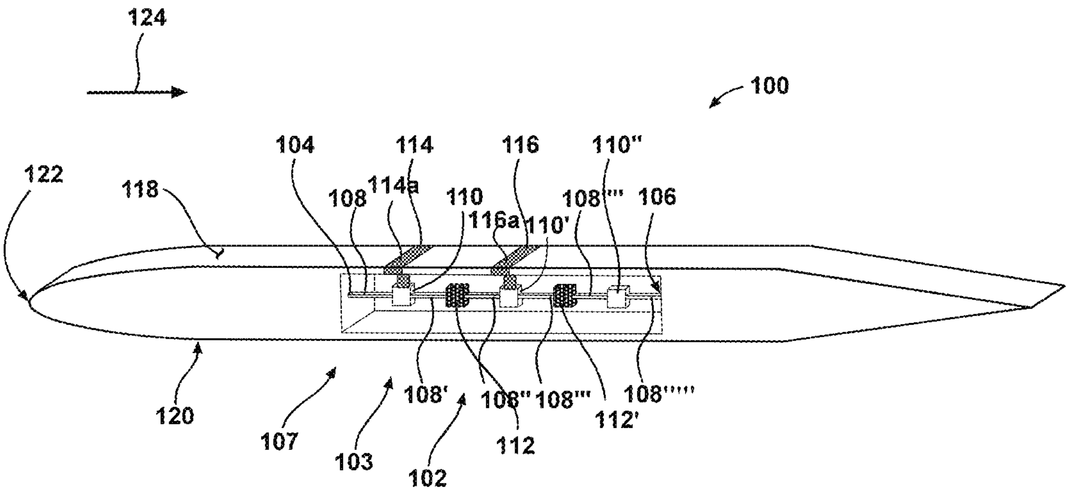

FIG. 13 is a first illustration of a PSub system according to one or more embodiments shown and described herein.

Figure 14:
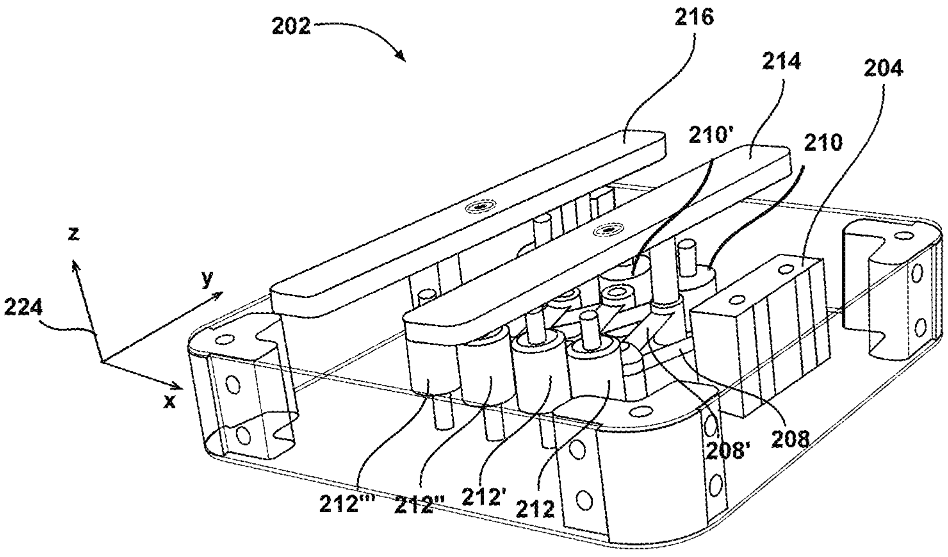

FIG. 14 is a second illustration of the PSub system of FIG. 13.

Figure 15:
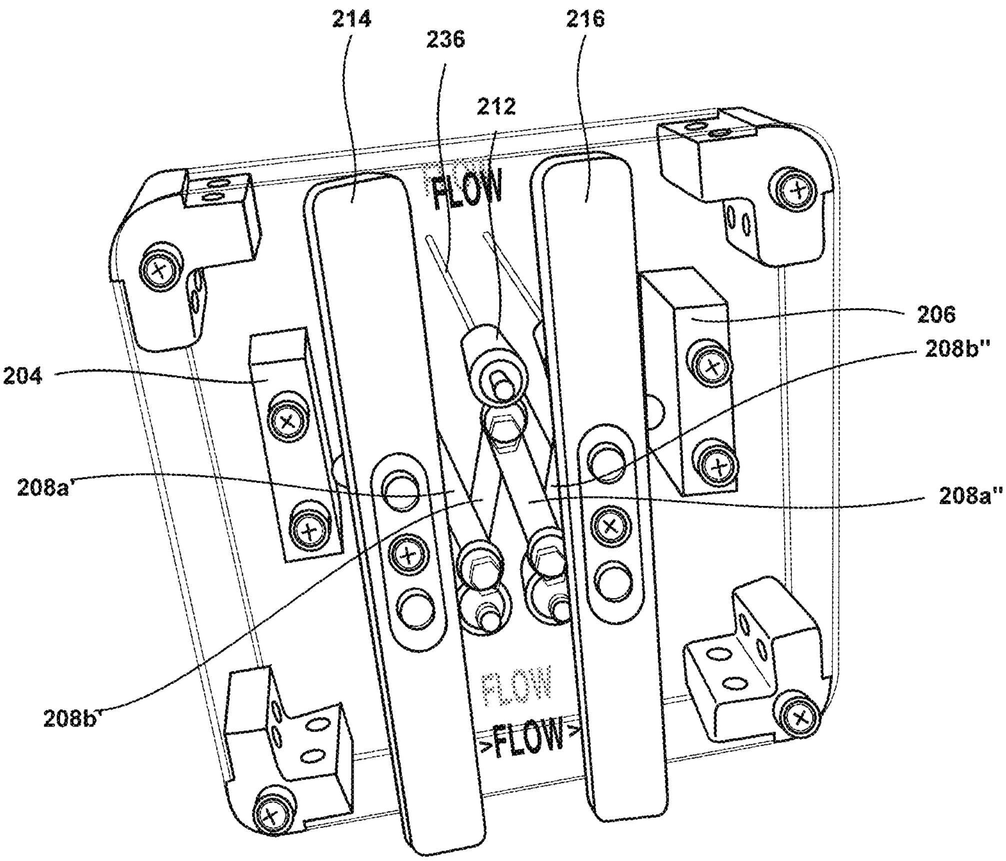

FIG. 15 shows an additional view of the PSub system of FIG. 13.

Figure 16A:
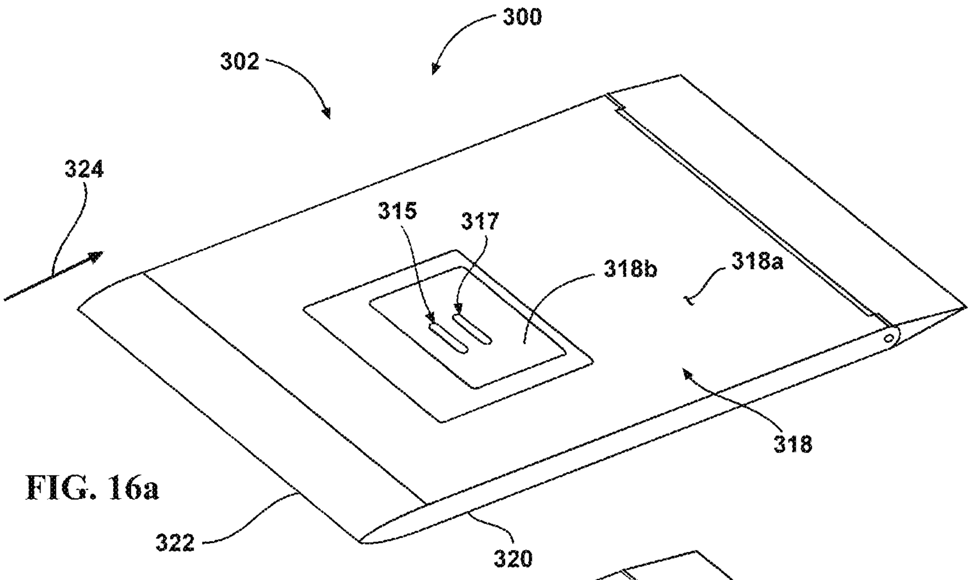

FIG. 16A shows the PSub system of FIG. 13 in a flow surface system with a cover plate installed.

Figure 16B:
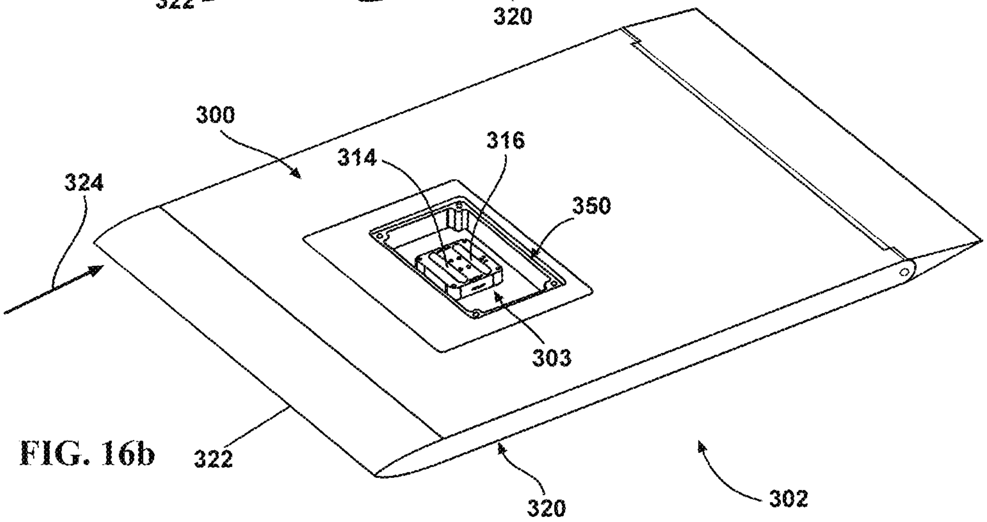

FIG. 16B shows the flow surface system of FIG. 15A with the cover plate removed, showing the PSub system of FIG. 13.

It should be understood that the appended drawings are not necessarily to scale and may represent a simplified depiction of various features, which may be illustrative of the basic principles of the invention. The specific design features and/or the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Phononic subsurfaces (Psub) may be used to develop a passive boundary layer transition delay strategy. High-order implicit large-eddy simulation (ILES) may be used to explore control requirements for boundary layer transition delay in the context of guiding passive flow control strategies. Positive phasing of surface displacement relative to forcing from a Tollmien-Schlichting (T-S) wave is shown to be effective at attenuating instability. Although difficult to achieve with a single input system, positive phasing can be realized with a multi-input, multi-output (MIMO) system. Positive phasing, and therefore a small degree of passive transition delay, may be demonstrated on a flat plate boundary layer. Controller efficacy may be improved with further optimization of subsurface properties and placement of multiple devices.

Nomenclature

A=interaction area
b=width of PSub beam
B=amplitude of surface motion
c=wavespeed
C=damping matrix
$C_f$=skin friction coefficient
$C_p$=pressure coefficient, $$C_p=(p-p_\infty)/(\rho U_\infty^2/2)$$

D=dynamic stiffness matrix
d=displacement vector
$d_i$=displacement vector element
E=Young's modulus of PSub beam
f=frequency
f=loading vector $f_j$=loading vector element F=non-dimensional frequency, $$F=\left(\frac{2\pi f\nu}{U_\infty^2}\right)\times 10^6$$

h=thickness of PSub beam

H=receptance matrix $H_{ij}$=receptance matrix element

I=identity matrix k=wavenumber in the flow

K=turbulent kinetic energy integrated across the boundary layer

K=stiffness matrix l=length of PSub beam

L=reference length $L_c$=controller length $L_g$=generator length $L_s$=distance between upstream and downstream interaction surfaces, $\lambda_{TS}(n+\gamma)$ L=primal assembly matrix m=concentrated rigid mass M=Mach number M=moment (finite element model)

M=mass matrix n=parameter of Lsspecifying family of equivalent coupling locations, {0, 1, 2, . . . } p=pressure

P=mechanical power $Re_L$=Reynolds number based on reference length, $Re_L=P_\infty U_\infty L/\mu_\infty$ t=time T=Floquet-Bloch condition matrix S=spanwise extent S=shear force (finite element model)

$U_\infty$=free stream reference velocity u, v, w=Cartesian components of flow velocity v=displacement of PSub (finite element model-perpendicular to x-direction)

x, y, z=coordinate system aligned with streamwise, normal, and spanwise directions Y†=interaction area-receptance product, Y†=AH*

α=beam element half length

γ=parameter of $L_s$ controlling forcing phase shift

δ=travel time of T-S wave from upstream to downstream interaction surfaces, $L_s/c_{TS}$ Δτ=non-dimensional time step ı=imaginary unit, $\sqrt{-1}$ κ=wavenumber in the PSub λ=wavelength μ=dynamic viscosity ρ=fluid density σ=spatial growth rate of T-S wave τ=non-dimensional time, $\tau=U_\infty/c$ ν=density of beam ϕ=phase of complex number in exponential form $\Phi_c$=phase of controller motion relative to generator ω=angular frequency, ω=2πf Subscripts ∞=free stream reference value −=upstream PSub interaction location +=downstream PSub interaction location $\bar{b}$=beam element $\tilde{b}$=disconnected arrangement of beam elements b=assembled system of beam elements vc=parameter associated with controller $\tilde{f}$=disconnected arrangement of unit cells (finite PnC)

g=parameter associated with generator i=index of displacement vector elements, also active control surface index j=index of loading vector elements PSub=parameter associated with PSub r=real part of complex number TS=parameter associated with T-S wave w=value at the wall $\widetilde{uc}$ =disconnected arrangement of masses and assembled beam element systems (unit cell)

uc=assembled system of mass and beam elements (unit cell)

ı=imaginary part of complex number

Operators

|•|=magnitude of complex number

∠=phase of complex number $\mathcal{F}^{-1}\{\bullet\}$=Inverse Fourier transform 2.1. Fluid Dynamics Solver Equations and other problems associated with the fluid dynamics described herein may be solved using a fluid dynamics solver (e.g., an aerodynamics solver). The solver used may be, for example, a solver such as the FDL3DI. Such code may solve full sets of compressible Navier-Stokes equations. The solver may be a high-order solver and employ, for example, a sixth-order compact difference scheme to compute spatial derivatives. Simulations may be integrated in time using a second-order implicit approximately factorized and diagonalized scheme. Time-integration may be augmented using a Newton-like sub-iteration procedure to drive down residual error and maintain second-order temporal accuracy.

In some embodiments, an implicit large-eddy simulation (ILES) technique may be implemented enabling solution of transitional and turbulent flows. This approach can use a high-order low-pass spatial filter applied to the flow field solution after sub-iterations (e.g., each sub-iteration). The filter can selectively damp the highest wavenumber content not supported by the grid resolution in place of subgrid-scale and heat flux models used in standard large-eddy simulation techniques. Such an ILES implementation can be an effective alternative to subgrid-scale models. As grid resolution increases or Reynolds number decreases, such an ILES technique can approach direct numerical simulation.

2.2. Fluid-Structure Interaction

Implicit coupling between, for example, a fluid dynamics solver such as the FDL3DI and the MIMO PSub model can be accomplished via a sub-iteration procedure. Within each sub-iteration, surface stresses can be integrated over each PSub interaction surface and transferred to the corresponding PSub nodes. The surface pressure can be balanced by a cavity pressure (i.e., $\Delta p=p-p_{cavity}$) where the cavity pressure, $p_{cavity}$, can be set to the time-mean surface pressure at each PSub interface in order to maintain a zero mean deflection. The resulting surface displacements and velocities are returned to the aerodynamics solver and used to adjust the boundary condition and grid motion at each PSub interface. This interchange may be repeated within each time step thereby synchronizing the two procedures and preserving second-order temporal accuracy for both the fluid and structural dynamics models. It should be noted that while the solver (e.g., aerodynamics solver) may be non-dimensional, the PSub model can be dimensional. The PSub structure is represented by a finite element model (FEM) model composed of Euler-Bernoulli beam elements and rigid masses, simulated in the time domain by one or more simulation methods, for example, the Newmark method. Forces and displacements can be translated between their dimensional/non-dimensional counterparts during this data exchange. Grid deformation can be accommodated using a cubic blending polynomial over a small region of influence above the plate surface.

3. Configuration

Various configurations are possible to achieve the results described herein. One exemplary configuration may be based on, for example, the use of piezoelectrically-driven oscillating disc actuators for generating disturbances and for subsequently controlling the growth of those disturbances. Some configurations may use, for example, a thick plate in order to house a subsurface in various wind tunnel experiments. In some embodiments, a 6:1 leading-edge aspect ratio may be used to minimize a risk of separation (e.g., the risk of separation that may be present with thicker geometry). In some embodiments, the configuration may be two-dimensional and exemplary relevant parameters are described in Table 1.

TABLE 1

| Problem Setup | |
|---|---|
| Property | Value |
| Freestream velocity, $U_\infty$ | 16 m/s |
| Freestream air density, $\rho_\infty$ | 1.225 kg/m$^3$ |
| Mach number, $M_\infty$ | 0.04665 |
| Reynolds number, $Re_L = \rho_\infty V_\infty L/\mu_\infty$ | 1,081,642 |
| Plate thickness | 0.0508 m |
| Leading edge aspect ratio | 6:1 |
| Reference length, L | 1 m |
| Generator length, $L_g$ | 0.00635 m |
| Generator amplitude, $B_g$ | $1 \times 10^{-5}$ m |
| Generator frequency, $f_g$ | 250 Hz |
| Generator position, $x_g$ | 0.273 m |
| Spanwise extent, s/L | 0.05 |

In one particular embodiment, T-S waves were generated by an oscillating surface positioned at $x_g$=0.273 m $$d_g = \begin{cases} B_g\left[1-\left(\frac{x-x_g}{L_g/2}\right)^2\right]^2 \sin\left(2\pi\frac{f_gL}{U_\infty}\tau\right), & 2|x-x_g| \le L_g \\ 0, & 2|x-x_g| > L_g \end{cases}, \quad \text{Eq. (1)}$$

where $B_g$ is the generator amplitude. In this exemplary embodiment, the generator was set to oscillate at a single dimensional frequency of $f_g$=250 Hz.

In embodiments, the computational mesh can be created using a hyperbolic extrusion from the plate surface. A half-plate model can be created by replacing the lower half with a symmetry plane. Dimensions for the resulting grid are recorded in Table 2.

Maximum values for grid spacing in wall units, Δx+, Δy+, Δz+, were obtained from spanwise periodic simulations of a generator-only case, ($B_g/L=1\times10^{-5}$), and provided in Table 2. These values occur at the peak in $C_f$ shown in FIG. 2. All values were well within the bounds recommended for wall-resolved LES. Previous experiments have demonstrated suitability of this mesh resolution for the turbulent regions of flow on nearly the same configuration.

The laminar flow regions, of specific importance to embodiments based on the principles of the technologies described herein, are particularly well resolved. In one embodiment, the grid can give 46 points across the $\lambda_{TS}$=0.023 m wavelength of the T-S wave. In this embodiment, there can be 112 and 137 grid points across the boundary layer at the generator and controller locations, respectively.

In one exemplary embodiment, boundary conditions may be prescribed to the computational mesh as follows. The no-slip condition can be enforced at the plate surface. Surface position and velocity at the generator may be directly applied according to Eq. (1) and controller surface displacement/velocity may be imposed according to subsurface motion. Third-order adiabatic and vanishing normal pressure gradient conditions may also be imposed at the surface. Freestream conditions may be specified at the far field boundary located approximately 50L away from the plate surface. First-order extrapolation of the primitive variables was applied at the outflow boundary. Three-dimensional simulations can be completed using periodic conditions at the spanwise boundaries. These boundaries can include a 9-point overlap to maintain the high-order stencil of the compact scheme and implicit filter. The domain width of the spanwise-periodic simulations may be s/L=0.05 in one or more embodiments.

As noted previously, the lower half of the plate may be replaced by a symmetry plane. Symmetry can be imposed on the grid line extending outward from the leading edge: Although not shown here, full plate simulations can be tested in two-dimensional cases demonstrating the symmetry assumption may not affect the upper surface flow behavior.

TABLE 2

| Grid Parameters | |
|---|---|
| Property | Value |
| Grid dimensions | 2150 × 272 × 209 |
| Grid size | 122,223,200 |
| Δx/L | $5.0 \times 10^{-4}$ |
| $\Delta y_w/L$ | $2.0 \times 10^{-5}$ |
| Δz/L | $2.5 \times 10^{-4}$ |
| Δτ | $1.6 \times 10^{-5}$ |
| $\Delta x^+_{max}$ | 25.0 |
| $\Delta y^+_{w,max}$ | 1.0 |
| $\Delta z^+_{max}$ | 12.5 |

In one or more embodiments, two-dimensional cases may be run with a very small time step of $\Delta\tau=3.2\times10^{-5}$ ($\Delta t=2.0\times10^{-6}$ s) which may allow for 2000 steps per cycle at a disturbance frequency of $f_g$=250 Hz (F=90.7).

Spanwise-periodic simulations can require a smaller time step of $\Delta\tau=1.6\times10^{-5}$ ($\Delta t=1\times10^{-6}$ s) to maintain stability in the fine grid region at the leading edge of the plate. All simulations were initiated from a previously converged unperturbed boundary layer where the generator and PSub/controller were enabled simultaneously. Simulations were then run until a time-asymptotic state was achieved before time-mean and statistical data was collected.

In various embodiments, several generator amplitudes were considered for testing with the PSub. Skin friction profiles for spanwise-periodic simulations for each generator amplitude are shown in FIG. 2. The gray bands in this figure indicate the eventual location of passive control surfaces for reference. The lowest generator amplitude, $B_g$=10 μm was selected for all cases in this study to place boundary layer transition (as indicated by a rapid increase in $C_f$) sufficiently far downstream of the planned control surfaces and to ensure that the PSub interacts with instabilities within the linear regime.

This simulation is referred to as the rigid case and used for comparison in each of the following sections. Theoretical predictions for laminar and turbulent boundary layer $C_f$ are provided for comparison.

Figure 3:
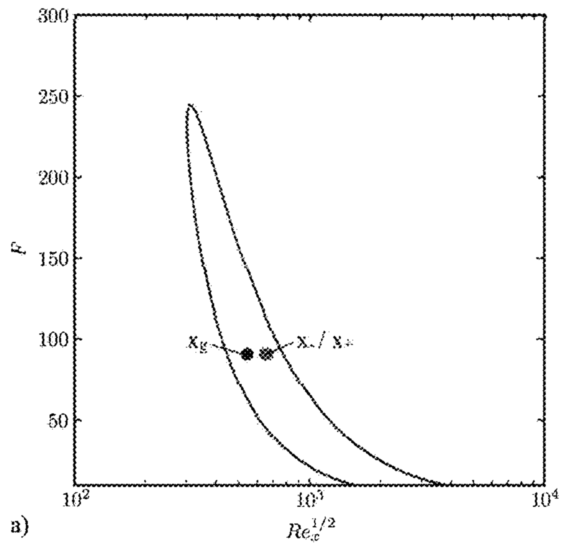
Figure 3:
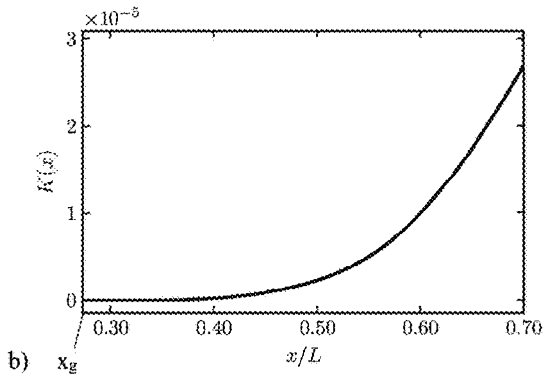

FIG. 3(*a*) shows the neutral curve for the Blasius boundary layer. The location of the generator, $x_g$, and passive controller surfaces, $x_-$ and $x_+$, are shown for the disturbance frequency of $f_g$=250 Hz. Stability theory predicts the flat plate boundary layer is unstable to the chosen frequency in the region of interest and this is indeed supported by FIG. 3B which shows the growth of TKE integrated across the boundary layer downstream of the generator. Rapid growth of the 250 Hz instability is maintained for the region of interest.

4. Subsurface Design Requirements Using Active Control

Active control using small-amplitude prescribed motion of multiple adjacent control surfaces, as depicted in FIG. 4, was explored first in order to better understand design requirements for passive T-S wave mitigation using distributed subsurfaces. FIG. 4 shows a generator 400, a first control surface 402, and a second control surface 404. Effects of various combinations of phase, amplitude, and number of controller segments on T-S wave amplification/attenuation were explored.

Relevant properties of this configuration are provided in Table 3. While a total of four control surfaces have been considered, the discussion will primarily focus on the case of two control surfaces.

TABLE 3

Parameters for active control simulations

| Property | Value |
|---|---|
| Generator location, $x_g$ | 0.273 m |
| Generator amplitude, $B_g$ | $1 \times 10^{-5}$ m |
| Generator frequency, $f_g$ | 250 Hz |
| Controller length, $L_c$ | 0.012 m |
| Controller amplitude, $B_c$ | 5 μm |
| Control surface 1 location, $x_1$ | 0.388 m |
| Control surface 2 location, $x_2$ | 0.400 m |
| TS wavelength, $\lambda_{TS}$ | 0.023 m |

In one or more embodiments, the first control surface can be centered at $x_1$=0.388 m with additional surfaces placed adjacently at intervals, for example, at intervals of 0.012 m downstream. In one or more embodiments, each control surface can be flat with a streamwise length of $L_c$=0.012 m. This is roughly half the T-S wavelength and may maximize the surface area exposed to the T-S wave for the passive simulations otherwise described herein. Although not shown, the results of this section may not be qualitatively affected if the controller length is reduced. Some blending with adjacent surfaces can be applied at the edges of each controller to preserve grid quality. In some embodiments, surface motion may be defined according to a traveling wave equation, given as $$d_i = B_c \sin(2\pi x_i/\lambda_{TS} - 2\pi f_g t + \Phi_c), \qquad \text{Eq. (2)}$$

where $d_i$ is the vertical motion (displacement) of control surface i, $x_i$ is the controller position, 80 $_{TS}$=0.023 m is the measured T-S wavelength, $f_g$=250 Hz is the generator/T-S wave frequency, and $\Phi_c$ sets the phase of motion. Matching the parameters to those of the T-S wave can allow for consistent phasing of each control surface relative to the T-S wave. Changing the value of $\Phi_c$ can shift the phase of surface motion relative to the T-S wave. The actual phase of each surface displacement relative to the T-S wave, $\phi(d_i/-p_i)$, for each $\Phi_c$ can be measured from simulation data.

Phase can be measured using the ratio of Hilbert transform of the time-domain. signals of displacement, di, and negative surface pressure measured at the center of the controller. This definition is representative of the relationship between displacement and loading on a passive surface, i.e., $f_i \approx -p_i A$. Note that phasing can be found to be nearly identical across all control surfaces when two or more controllers are active.

In one or more embodiments, one, two, and four controller segments were tested at amplitudes of $B_c$=1, 5, and 10 μm at intervals of $\Delta\Phi_c$=20°. Only the results for the two-segment case at $B_c$=5 μm are shown here for brevity. Two quantities were of interest; the phase of surface motion relative to the pressure force on the surface due to the T-S wave, $\phi(d_i/-$p_i) and the effect of this phasing on the T-S wave downstream. For the computational fluid dynamics (CFD) simulations, this was quantified by integrating turbulence kinetic energy (TKE) across the boundary layer along coordinate lines normal to the plate surface defined as, $$K(x) = \frac{1}{LU_\infty^2} \int \frac{1}{2}\left(\overline{u'u'} + \overline{v'v'} + \overline{w'w'}\right) dy \qquad \text{Eq. (3)}$$

where u', v', w' are the fluctuations of velocity components. FIG. 5 shows the difference between the controlled and uncontrolled cases, $\Delta K = K_{control} - K_{rigid}$, at a single position downstream of the control surfaces, x=0.5 m. The horizontal axis portrays the phasing of the surface motion relative to negative surface pressure, $\phi(d/-p)$. In general, these results show. that a positive phase is desirable forattenuating T-S waves with peak attenuation near $\phi \approx 57°$.

This observation was further supported by linear stability analysis. A linear framework was developed using the classical Orr-Sommerfeld equation where the moving/compliant surfaces are modelled using a dynamic boundary condition in the form of complex admittance, $Y(x) = \hat{v}\hat{p}$.

The Orr-Sommerfeld equation is then recast as a general eigenvalue problem to attain the spatial growth rate σ. In this case, the effect of forced surface motion is introduced through the parameter Y.

FIG. 6 shows the spatial growth rate as a function of $$Y^\dagger = \frac{\hat{d}}{-\hat{p}} = |Y^\dagger| e^{-\iota \angle Y^\dagger} \qquad \text{Eq. (4)}$$

which is simply an altered version of the wall admittance in the context of displacement and negative surface pressure for consistency with the present definition of phasing. The linear stability map predicts T-S wave attenuation for generally positive phases in qualitative agreement with the CFD simulations. Bounds for T-S wave attenuation as well as optimal phase values for each are provided in Table 4 which are again very close between the two approaches. The $\phi_{optimal}$ from the linear stability identifies the phasing that provides complete stabilization at the smallest amplitude whereas $\phi_{optimal}$ from the CFD is the value that minimizes K at a fixed amplitude. Note, the negative sign appearing in the argument of Eq. (4) accounts for a sign difference in the definition of the traveling wave phase function used in the stability analysis ($-\iota\omega t$), and the one used in the definition of the inverse Fourier transform ($+\iota\omega t$) of the CFD generated time-domain signal analysis, as well as the analysis of the PSub to follow. Note, {is the imaginary unit $\sqrt{-1}$.

TABLE 4

Phase bounds for T-S wave attenuation

| | $\phi_{min}$ | $\phi_{optimal}$ | $\phi_{max}$ |
|---|---|---|---|
| Linear stability | −10° | 90° | 170° |
| CFD | −20° | 57° | 161° |

Although not shown, in some embodiments, this analysis was repeated for several amplitudes, frequencies, number of controller segments, and Reynolds numbers and found to be broadly consistent across all parameters considered in both the linear stability and CFD frameworks. Similar results were also found for a small amplitude traveling surface wave. The greatest sensitivity was observed for the single controller case at larger amplitudes in the CFD simulations (linear stability was unaffected by the number of controller segments). This behavior seems related to an upstream effect due to acoustic emissions from the control surface. This effect appeared to be alleviated when multiple adjacent control surfaces were operating out of phase thereby reconciling with the theoretical results.

These active control simulations can show that distributed micrometer-scale surface motion can be effective for boundary layer transition delay on a flat plate. The critical factor appears to be the phasing of surface motion relative to the T-S wave, $\phi(d/-p)$. This observation is applied to the design of a subsurface capable of providing a passive stabilizing response as described herein.

5. Passive control

Observations of the active control simulations were used to design and implement a new passive subsurface control strategy. Specifically, the phase ranges listed in Table 4 are used in one or more embodiments as stability criteria of the MIMO Psub response surfaces. Theoretical development is described herein, as well as implementation of fully-coupled fluid structure interaction (FSI) CFD simulations demonstrating successful boundary layer transition delay.

5.1. Multi-Input Multi-Ouput Phononic Subsurface

Psubs are a class of PnC, which are embedded in a flow-bounded material/structure and allowed to interact through discrete coupling interfaces that transduce pressure/displacements between the Psub and exterior flow phenomenon. When a Psub interacts with a flow containing a T-S wave, the vibration of the Psub can cause a localized reduction in the TKE of the flow in the volume above the PSub interaction surface. Designs of some Psubs rely on displacement to force phasing of −180°, provided by a truncation resonance. Since the PSub displacement-over-forcing response phase is stable (i.e., the value changes slowly over a long range of frequency) inside a band gap, the PSub acts a robust passive actuator. The approximately sinusoidal T-S wave pressure imparts a loading force on the interaction surface and causes the PSub to respond by vibrating according to its dynamic compliance (i.e., receptance). The displacement of the PSub, ultimately causes the generation of additional time varying pressure fluctuations in the flow that can lead to a localized cancellation of the T-S wave, indicated by a drop in the TKE of the flow.

Otherwise discussed herein are investigations of active control via forced surface motion using linear stability analysis as well as nonlinear CFD simulations. Such investigation may demonstrate that positive phasing between displacement and force at the interaction surface can cause global flow quieting (i.e., flow stabilization at points after the interaction surface). Specifically, +90° is identified by stability analysis as being ideal, but there is an envelope that includes almost all positive and some slightly negative phases, as being stabilizing, as identified in Table 4. However, positive phasing may be unfeasible from a passive vibrating system with only a single point of interaction (i.e., single-input single-output (SISO) system) with the flow.

A general discretized vibrating system can be represented, in the frequency domain, by $$\hat{f} = [K + \iota\omega C - \omega^2 M]\hat{d} = D(\omega)\hat{d} \quad \text{Eq. (5)}$$

where M, C, K, D are the mass, damping, stiffness, and dynamic stiffness matrices, $\hat{d}$ and $\hat{f}$ are the nodal displacement and forcing vectors, and $\omega=2\pi f$ is the angular frequency while f is frequency in Hz. The system may be solved for the displacement due to a given load for each frequency by $D^{-1}\hat{f}=H\hat{f}=\hat{d}$, where H is the receptance matrix, whose elements $H_{ij}(\omega)$ relate the displacement $\hat{d}_i$ (an element of $\hat{d}$) to the applied force $\hat{f}_j$ (an element of $\hat{f}$).

Given that the forced motion study identified an envelope of phases that lead to T-S wave stabilization, it can be beneficial that a PSub be designed with equivalent SISO PSub response phases within the bounds of Table 4. Analysis discussed herein demonstrates that such response phases can be achieved by allowing multiple points on the structure to interact with the flow. In the simplest case, two points of interaction are considered so that $\hat{f}$ has two nonzero elements at the upstream (US), indicated by subscript-, and the downstream (DS), indicated by subscript +, locations.

Thus, $i, j \in \{-, +\}$, and the displacement at each interaction surface is a superposition, written as $$\hat{d}_- = H_{--}\hat{f}_- + H_{-+}\hat{f}_+ \quad \text{Eq. (6)}$$

$$\hat{d}_+ = H_{+-}\hat{f}_- + H_{++}\hat{f}_+ \quad \text{Eq. (7)}$$

The response at each point is governed by its collocated receptance, and a response that is propagated from each point to the other by a cross receptance. Forcing at each interaction location is provided by the incident T-S wave pressure, which can be modeled as $$p_- = p_{TS}(0, t) = \mathcal{F}^{-1}\{\hat{p}(\omega)\} \quad \text{Eq. (8)}$$

$$p_+ = p_{TS}(L_s, t) = \mathcal{F}^{-1}\{\hat{p}(\omega)e^{-\iota\omega\delta}\} = \mathcal{F}^{-1}\{\hat{p}(\omega)e^{-\iota\omega L_s/c_{TS}}\} = \mathcal{F}^{-1}\{\hat{p}(\omega)e^{-\iota k_{TS} L_s}\} \quad \text{Eq. (9)}$$

where $p_{TS}$ is the time-domain perturbation pressure associated with the T-S wave and $k_{TS}=2\pi/\lambda_{TS}$ is the T-S wavenumber. $p_+$ is equivalent to the time delayed signal observed at $p_-$, as is shown in FIG. 7A.

Allowing the two points of flow interaction with the MIMO PSub to occur at different positions along the x direction means that there is a well-understood phase shift between the forcing at US and DS, that corresponds to the time delay $\delta=L_s/c_{TS}$ between the two signals, where T-S wavespeed is $c_{TS}=\lambda_{TS}f_g$ and the T-S center frequency (i.e., generator frequency) is $f_g=250$ Hz.

It should be understood that the PSub will respond to the bandwidth of frequencies that are imposed by the T-S wave forcing, whose center frequency is $f_g$, but in order to study the response at other frequencies, a general frequency f is also defined that is related to the angular frequency as $\omega=2\pi f$. When studying frequencies away from $f_g$, $\lambda_{TS}=\omega/c_{TS}$. Here, $c_{TS}$ is assumed to be constant over the studied range of frequencies.

Setting the distance between US and DS positions as $x_+-x_-=L_s$, the forces transduced to the structure are $\hat{f}_-=-A\hat{p}(\omega)$ and $\hat{f}_+=-A\hat{p}(\omega)e^{-\iota k_{TS}L_s}$, where A is the coupling area at each interaction surface, and thus the phase between the pair of forces can be adjusted by changing the distance between them in x (i.e., $L_s$). The length between interaction surfaces is specified as $L_s=\lambda_{TS}(n+\gamma)\forall n\in\{0,1,2, \ldots]$ and $0<\gamma<1/2$, which specifies a family of points with a phase shift range (as a function of $\gamma$) of $0<k_{TS}L_s<180°$ between US and DS forcing. In the design of FIG. 7A, n=1 and $\gamma=1/4$ so that $k_{TS}L_s=90°$, but a family of points (i.e., those $L_s$ with other n values) is allowed since it may be necessary to include multiple wavelengths between the US and DS to accommodate the length of the MIMO PSub. Limits on $\gamma$ are exclusive, since at the limit bounds, the ACR will lose the large frequency ranges of nearly constant stabilizing phase associated with the band gap. Note, modeling the T-S wave as a propagating wave does not include its growth.

Multiple structures could be designed to produce the required response phasing, but PnCs have been used in the past and have well understood behavior which simplifies the design process. In this work, the MIMO PSub design consists of rigid masses, whose rotations are locked, linked by flexible beams, as shown in FIG. 7A below the Flow-PSub interface line. Masses along the length of the MIMO PSub alternate in value between m1 and m2 (i.e., a diatomic beam-based PnC). Parameters of the MIMO PSub model for some embodiments are given in Table 5. PnCs are periodic structures which, exhibit pass bands (i.e., white shaded background regions where dispersion curves exist) and band gaps (i.e., gray shaded regions with no dispersion curves) as shown in FIG. 7B. The finite PSub system resonances, identified as peaks in the component collocated and cross receptances shown in FIG. 7C, are usually confined to pass bands, while only truncation resonances can exist in the band gap. Since, the dispersion curves of the PSub are designed by specifying elements of the unit cell (i.e., the repeated unit used to create the periodic structure of the PnC), the pass band and band gap widths can be specified prior to dealing with resonances of the finite structure. Most importantly, since there are few if any resonances in the band gap it is assured to be a frequency band of stable phase. Note, otherwise described herein is at least one procedure for obtaining the dynamic stiffness matrix of the finite MIMO PSub which can be used to construct the receptance matrix. Also described herein is a process for obtaining dispersion curves, shown in FIG. 7B, from the unit cell dynamic stiffness matrices discussed herein.

The apparent collocated receptance (ACR) at US and DS interaction surfaces can be written:

$$H_- = \frac{\hat{d}_-}{\hat{f}_-} = H_{--} + H_{-+}\frac{\hat{f}_+}{\hat{f}_-} = H_{--} + H_{-+}e^{-\iota k_{TS}L_s} \quad \text{Eq. (10)}$$

-continued $$H_+ = \frac{\hat{d}_+}{\hat{f}_+} = H_{+-}\frac{\hat{f}_-}{\hat{f}_+} + H_{++} = H_{+-}e^{-\iota k_{TS}L_s}H_{++} \quad \text{Eq. (11)}$$

Equations (10) and (11) are the effective responses when the component collocated receptances, shown in FIG. 7C, are combined taking into account the 90° forcing phase shift between US and DS positions (i.e. $L_s=5/4\lambda_{TS}=(n+\gamma)\lambda_{TS}$). If $\gamma$ had been zero or ½, then $k_{TS}L_s$ would be 0° or 180°, which would stop the ACR from taking on phase values other than 0° or 180°. Consequently, as long as the phase of the ACR about the T-S wave frequency is within the stability bounds established by the forced motion studies for a single surface, it is expected that the induced motion of the MIMO PSub coupled surfaces will generate canceling T-S waves as in FIG. 7A, where the original T-S wave (red) induces T-S waves 1 (magenta) and 2 (aqua) with phase shifts dictated by the ACR. The ACR computed at the US and DS locations are plotted for multiple values of the forcing phase shift, $k_{TS}L_s$, in FIG. 8A and 8B, respectively. Also, zoomed-in views of the ACR phase curves are shown in FIG. 8C and 8D to demonstrate that the phase of the ACR is stable in the band gap and falls approximately within the stabilizing range. At US and DS, the ACR phases are $\angle H_-=17.967°$ and $\angle H_+=-21.913°$ for 250 Hz with $k_{TS}L_s=90°$, respectively, which are consistent with the stability bounds found by CFD in Table 4. These results can be related to the stability analysis described herein by realizing that the ACR at US or DS can be written as $H=\hat{d}/\hat{f}=\hat{d}/-\hat{p}A=(Y\dagger)^*/A$. Note, the complex conjugation corrects for the negative in the argument of Eq. (4). It is important to note that the US surface reduction in TKE, dominates the effect of the DS surface which has a marginal impact on TKE, and can be understood by review of FIG. 5.

Finally, a method has been presented for realizing robust T-S wave suppression using a MIMO PSub that is designed with ACR (at each interaction surface) with broad frequency ranges of phase within the envelope of stabilization (as specified by the previous analysis). The main trade off here is that there is typically low receptance amplitude inside the band gap, but in the presented MIMO PSub, the ACR amplitudes slowly increase across the band gap as frequency approaches the second pass band, as shown in FIG. 8A and 8B, which results in a sufficient amount of amplitude to create a meaningful T-S wave cancellation.

5.2. Computational demonstration of transition delay

The MIMO PSub concept was incorporated into the flat plate geometry as shown in FIG. 9. FIG. 9 shows a generator 900, an upstream interaction surface 902, and a downstream interaction surface 904. Similar to the active control simulations, in one or more embodiments, the length of each control surface was $L_c=0.012$ m ($\approx\lambda_{TS}/2$) with some smoothing at the edges to preserve grid quality. Control surfaces were placed at $x_-=0.388$ m and $x_+=0.4165$ m. The distance between $x_+$ and $x_-$ was determined by the subsurface design which specified a separation of $(5/4)\lambda_{TS}$ to achieve proper phasing of control surface motion, as described herein. The interaction surfaces are FEM nodes 7 and 21, which correspond to the first and third masses of the MIMO Psub shown in FIG. 7A. Forces on each control surface were obtained by integrating pressure over the relevant surface points. As noted herein, in one or more embodiments, three-dimensional simulations were completed using spanwise-periodic conditions. Therefore, forces were computed per unit span and then scaled to the specified width of the interaction surface.

TABLE 5

| Parameters of the MIMO PSub | |
|---|---|
| Property | Value |
| Density, v | 2700 kg/m$^3$ |
| Young's Modulus, E | 68.9 GPa |
| Beam thickness, h | 0.35 mm |
| Beam width, b | 1 mm |
| Beam length, l | 14.375 mm |
| Mass 1, $m_1$ | 4 g |
| Mass 2, $m_2$ | 0.72 g |

Passive control using Psubs may best be achieved through a distributed array of numerous subsurfaces, each providing small contributions to boundary layer transition delay with a large effect in aggregate. The effect of a single MIMO Psub device is shown here. Therefore, a fairly large width of s=0.4 m was used in one or more embodiments to produce a strong response with a clearly demonstrated effect on boundary layer transition. Further optimization of the subsurface may drive down surface area requirements alongside application of subsurface arrays.

TABLE 6

| Parameters for passive control simulations | |
|---|---|
| Property | Value |
| Generator location, $x_g$ | 0.273 m |
| Generator amplitude, $B_g$ | $1 \times 10^{-5}$ m |
| Generator frequency, $f_g$ | 250 Hz |
| Controller length, $L_c$ | 0.012 m |
| Controller width, $w_c$ | 0.4 m |
| Upstream interaction surface, $x_-$ | 0.388 m |
| Downstream interaction surface, $x_+$ | 0.4165 m |
| TS wavelength, $\lambda_{TS}$ | 0.023 m |

In one or more embodiments, passive control simulations were initiated from a previously converged boundary layer plate solution. Generator and controller were enabled at the same time and simulations were run until achieving a time-asymptotic state. This required a run time of $\tau$=9.6 or 600,000 iterations at the chosen time step. Time-mean and statistical data was then collected over three runs of $\tau$=3.2 (200,000 iterations) for a total run time of $\tau$=19.2 (1,200,000 iterations). Quantities of interest were then compared over the three consecutive runs to verify the ILES settled on a consistent response as demonstrated herein. MIMO PSubs may be tested by running computationally efficient two-dimensional simulations, which may provide a good prediction of the flow response up to onset of three dimensional instabilities.

Time-mean amplitude (amplitude and phase were extracted from the fast Fourier transform of displacement and load in this case.), $[\bar{d}]$, is shown in FIG. 10A for each of the PSub control surfaces. In embodiments, amplitude may not change significantly between consecutive runs and may be consistent with those predicted by purely two- dimensional simulations. Phasing of the displacement relative to the input load is shown in FIG. 10B for both control surfaces. The shaded region indicates phasing predicted by linear stability to provide attenuation, see FIG. 6. In one or more embodiments, the time-mean phase of both surfaces was found to be consistent between consecutive runs and effectively identical to the response of the purely two-dimensional simulation. The upstream surface may operate at a phase well within the gray region, indicating an attenuating effect on the T-S wave, whereas the downstream surface responded with a phase at the edge of the gray region, indicating little effect on the T-S wave.

Figure 11:
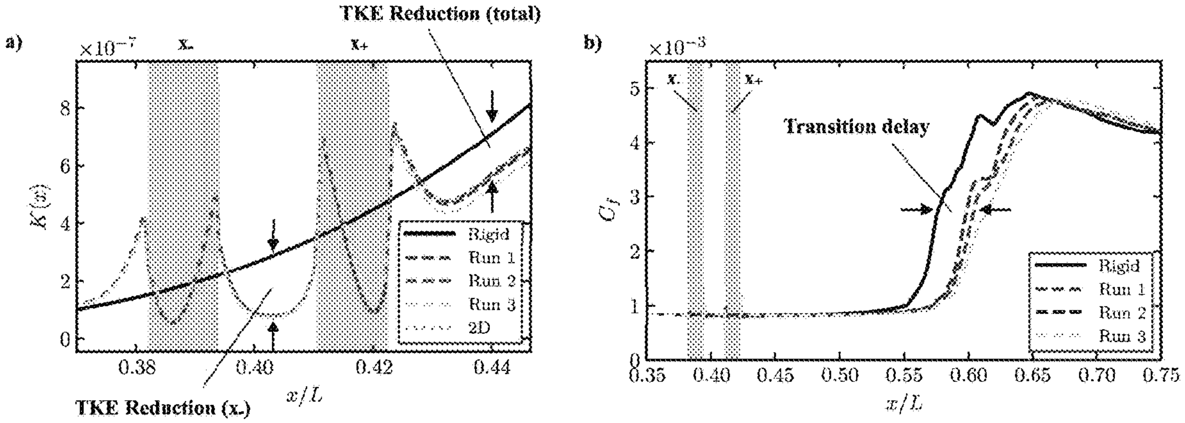

FIG. 11 (*a*) shows the streamwise distribution of K near the two control surfaces in one or more embodiments. A drop in K can indicate a reduction in kinetic energy across the boundary layer and delayed growth of instability and vice versa for a rise inK. The two shaded regions of the figure portray the extent of each control surface as labeled. Comparison of K with the rigid case just downstream of each control surface is of primary interest. A marked drop in K appears just downstream of the first control surface indicating a significant stabilizing effect on the flow. Most of this stabilizing effect is maintained downstream of the second control surface as indicated by the reduction in K relative to the rigid case. This reduction in K at the control surfaces results in a shift of the skin friction coefficient in FIG. 11B, indicative of delay in boundary layer transition. Boundary layer transition delay is visually confirmed in FIG. 12 which shows a top down view of the Q-criterion iso-surface. This quantity reveals three-dimensional vortical structure in the flow. Onset of spanwise instabilities are clearly shifted by roughly 5% of the reference length.

As before, K and $C_f$ may not change substantially over time indicating consistency in the subsurface effect. Furthermore, the K profile is well-predicted by two-dimensional simulations. This demonstrates two-dimensional laminar simulation as an accurate predictor for the relative effect of a particular subsurface on the flow. Computationally expensive three-dimensional simulations need not be applied until verification of transition delay is desired.

As noted previously, positive phasing required to achieve the strongest T-S wave attenuation implies an unrealistic negative damping coefficient for single input systems. Energy considerations shed further light on how the MIMO system bypasses this restriction. Mechanical power, $P=\dot{v}\cdot f$, was measured at both control surfaces where v is the surface displacement, the overdot indicates a derivative with respect to time, and $f=-\int p dA$ is the forcing on the surface. Time-averaging yields $\bar{P}_-=-3.26\times10^{-4}$ W and $\bar{P}_+=-3.26\times10^{-4}$W for the upstream and downstream surfaces, respectively. In some embodiments, the MIMO subsurface appears to extract energy from the flow at the downstream surface where T-S waves are stronger and redeposits that energy into the flow at the upstream surface.

Referring back to FIG. 10B, it can be assumed that most of the subsurface efficacy stems from the motion of the first control surface given its positive phasing and comparable amplitude. The downstream surface can be assumed to have little effect on the flow given its phasing falls at the edge of the range of phases predicted by linear theory to reduce T-S wave instability. The controller surface at $x_+$ appears to be slightly detrimental to T-S wave mitigation. However, input from the flow at this location is necessary to elicit the favorable response at $x_-$. Further improvement to MIMO PSub devices would benefit from a similar approach, i.e. a more neutral/smaller amplitude downstream surface to extract flow energy and a mechanical system designed to provide optimal phasing at the upstream surface.

6. Conclusions

Boundary layer control for flow transition delay was explored using high-order ILES on a flat plate with a 6:1 ellipse leading edge operating at a Reynolds number of 1,081,642 per meter length and a very low Mach number of $M_\infty$=0.04665. Disturbances were generated using an oscillating surface located at $x_g$=0.273 m downstream of the leading edge. T-S waves were generated at a frequency $f_g$=250 Hz which falls within the unstable regime. The amplitude of the generator was selected to place flow transition sufficiently far downstream of the controller-interfaces.

Active control using several small-amplitude oscillating surfaces was explored first in order to determine phase and amplitude necessary for a distributed array of controllers to delay onset of flow transition. It was found that several control surfaces could significantly delay flow transition with micrometer-scale oscillations. The critical factor was the phasing of the control surface relative to the T-S wave. This was measured as the phase of displacement relative to input load, i.e., $\phi(d_i/f_i) \approx \phi(d_i/-p)$. Linear stability analysis predicted T-S wave attenuation for $-10° < \phi(d_i/-p) < 170°$ while similar bounds were found in the CFD simulations.

These results were used to inform the design of a passive subsurface capable of providing amplitude and phase within the stabilizing regime. This proved a challenging task as positive $\phi(d_i/f_i)$ is difficult to achieve for a single input system. Therefore, a multi-input multi-output (MIMO) system was designed. Allowing the structure to interact with the flow at multiple points provided forcing at each exposed node with a known phase shift between each, which was leveraged to obtain an apparent collocated receptance (ACR) capable of exhibiting phases within the stabilizing regime.

The change in TKE for a given response (displacement/force) phasing obtained during the forced motion study, is consistent with phases of the passive ACR exhibited by each interaction surface of the MIMO PSub.

Fully-coupled passive control simulations were completed using the MIMO PSub. Positive phasing was achieved at the first control surface and slightly negative phasing at the second. Onset of flow transition, as determined by a rapid increase in $C_f$, was shifted downstream by roughly 5% of the reference length for this single subsurface.

Positive phasing implies the mechanical subsurface performs work on the flow which is an unrealistic expectation from a single input system. This restriction is bypassed by the MIMO design.

Energy appears to be extracted from the flow at the downstream surface where T-S waves are stronger and redeposited into the flow at the upstream surface to mitigate instability where the T-S waves are weaker. While most of the efficacy in the current system stems from the upstream surface, the downstream surface operates at the edge of the attenuation regime and in theory has little effect on the stability of the flow. Further optimization of the subsurface structure is likely to improve sensitivity and efficacy of the MIMO PSub by taking these factors into consideration.

Distribution of multiple subsurfaces may further extend boundary layer control through incremental contributions from each passive controller. Optimization of the MIMO PSub design may further delay transition. Furthermore, one or more embodiments show that computationally efficient two-dimensional simulations were sufficient to evaluate the relative effect of control surfaces. More expensive three-dimensional simulations were only necessary to confirm transition delay of final subsurface design.

Finite Element Model of Phononic Subsurface

This section gives a procedure for constructing the finite PSub FEM model from simpler components. This method consists of successive rounds of constructing block matrices of non-interacting subcomponents (i.e., the disconnected system), and then assembling these subcomponents by imposing associations between the displacements and forces of the subcomponents. In one or more embodiments, this may be achieved by expressing them in terms of a reduced set of displacements and forces (i.e., those of the assembled system). A primal assembly matrix is responsible for imposing the associations between the variables of the disconnected and assembled systems.

The PSub studied in this work is composed of flexible beams and rigid masses. The first step is to assemble a set of finite elements describing the beam dynamics to form an assembled beam system. In one or more embodiments, consistent mass and stiffness matrices for a beam element may be given as $$M_b = \frac{vA\alpha}{105}\begin{bmatrix} 78 & 22\alpha & 27 & -13\alpha \\ & 8\alpha^2 & 13\alpha & -6\alpha^2 \\ & & 78 & -22\alpha \\ sym. & & & 8\alpha^2 \end{bmatrix}, \quad \text{Eq. (A.1)}$$

and $$K_b = EI\begin{bmatrix} \frac{3}{2\alpha^2} & \frac{3}{2\alpha^2} & -\frac{3}{2\alpha^2} & \frac{3}{2\alpha^2} \\ & \frac{2}{\alpha} & -\frac{3}{2\alpha^2} & \frac{1}{\alpha} \\ & & \frac{3}{2\alpha^2} & -\frac{3}{2\alpha^2} \\ sym. & & & \frac{2}{\alpha} \end{bmatrix}, \quad \text{Eq. (A.2)}$$

where Young's modulus is E, density is ν, cross-sectional area is A=bh, the second moment of area is $I=bh^3/12$ and the element half-length is α=1/8. The beam element displacement vector is $$\hat{d}_{\bar{b}} = \{\hat{v}_1, \hat{v}'_1, \hat{v}_2, \hat{v}'_2\}^t,$$

and the force vector is $\hat{f}_{\bar{b}} = \{\hat{S}_1, \hat{M}_1, \hat{S}_2, \hat{M}_2\}^t$, where the subscripts are indices of the element nodes. Here, $\hat{v}$ is displacement perpendicular to the x-direction, $\hat{v}' = d\hat{v}/dx$, $\hat{S}$ is the shearing force and $\hat{M}$ is moment. Note, the superscript trefers to the transpose operation. The beam elements may be derived with cubic shape functions such that fewer elements are necessary to represent multiple wavelengths along the beam.

Each beam used in the unit cell may be formed of four beam elements (i.e., $N_{be}=4$), each having two nodes, with two nodal degrees of freedom. To constructing the total stiffness and mass matrices of the beam, the elemental mass and stiffness matrices are arranged in a block diagonal fashion as $$\hat{f}_{\bar{b}} = \left(\begin{bmatrix} K_{\bar{b}}^1 & \dots & 0 \\ & \ddots & \\ 0 & \dots & K_{\bar{b}}^{N_{be}} \end{bmatrix} - \omega^2 \begin{bmatrix} M_{\bar{b}}^1 & \dots & 0 \\ & \ddots & \\ 0 & \dots & M_{\bar{b}}^{N_{be}} \end{bmatrix}\right)\begin{Bmatrix} d_{\bar{b}}^1 \\ \vdots \\ d_{\bar{b}}^{N_{be}} \end{Bmatrix} = D_{\bar{b}}(\omega)\hat{d}_{\bar{b}}, \quad \text{Eq. (A.3)}$$

where $D_{\bar{b}} = (K_{\bar{b}} - \omega^2 M_{\bar{b}})$ is the disconnected dynamic stiffness matrix of the beam FEM model.

The nodal degrees of freedom of the disconnected beam elements in $\hat{d}_{\bar{b}}$ can be expressed in terms of the reduced set of degrees of freedom for a fully connected beam of the unit cell by $$\hat{d}_{\tilde{b}} = \begin{bmatrix} \begin{Bmatrix} 1 \\ 0 \end{Bmatrix} & 0 & 0 & 0 & 0 \\ 0 & I_{2\times2} & 0 & 0 & 0 \\ 0 & I_{2\times2} & 0 & 0 & 0 \\ 0 & 0 & I_{2\times2} & 0 & 0 \\ 0 & 0 & I_{2\times2} & 0 & 0 \\ 0 & 0 & 0 & I_{2\times2} & 0 \\ 0 & 0 & 0 & I_{2\times2} & 0 \\ 0 & 0 & 0 & 0 & \begin{Bmatrix} 1 \\ 0 \end{Bmatrix} \end{bmatrix} \begin{Bmatrix} \hat{d}_b^1 \\ \hat{d}_b^2 \\ \hat{d}_b^3 \\ \hat{d}_b^4 \\ \hat{d}_b^5 \end{Bmatrix} = L_b \hat{d}_b, \quad \text{Eq. (A.4)}$$

where $L_b$ is a primal assembly matrix. Here, $L_b$ has been constructed such that the rotational degrees of freedom of the first and last nodes of the disconnected beam element system are set to zero, thereby imposing the zero rotation condition at the end of each assembled beam system. Thus, the first and last degrees of freedom in the displacement vector of the assembled system are $d_{\tilde{b}}=\hat{v}$, while the motion of all other nodes are described by displacement subvectors $d_{\tilde{b}}=\{\hat{v}, \hat{v}'\}^t$. The assembled beam matrix equation is then written $$\hat{f}_b = L_b^t(K_{\tilde{b}} - \omega^2 M_{\tilde{b}})L_b\hat{d}_b = (K_b - \omega^2 M_b)\hat{d}_b = D_b\hat{d}_b.$$

In addition to beams, rigid masses are also a component of the unit cells comprising the finite PSub studied in this work. The relationship between the motion of a mass and a force applied to it is expressed as $\hat{f}_m=-\omega^2 m\hat{d}_m$ where m is mass. Additional mass at the nodes can be added by incorporating this relationship into the FEM. Since the rotation of the masses is restricted there is no need to include any such degree of freedom. The fully assembled beam FEM model and rigid mass relationship will serve as the simple subsystems to be connected in the next step to form the unit cell FEM model.

A dynamic stiffness matrix of the unit cell is formed by arranging the elements in a disconnected block matrix as $$\hat{f}_{\tilde{uc}} = \left( \begin{bmatrix} 0 & 0 & 0 & 0 & 0 \\ 0 & K_b^1 & 0 & 0 & 0 \\ 0 & 0 & 0 & 0 & 0 \\ 0 & 0 & 0 & K_b^2 & 0 \\ 0 & 0 & 0 & 0 & 0 \end{bmatrix} - \omega^2 \begin{bmatrix} m_1/2 & 0 & 0 & 0 & 0 \\ 0 & M_{\tilde{b}}^1 & 0 & 0 & 0 \\ 0 & 0 & m_2 & 0 & 0 \\ 0 & 0 & 0 & M_{\tilde{b}}^2 & 0 \\ 0 & 0 & 0 & 0 & m_1/2 \end{bmatrix} \right) \begin{Bmatrix} \hat{d}_m^1 \\ \hat{d}_b^1 \\ \hat{d}_m^2 \\ \hat{d}_b^2 \\ \hat{d}_m^3 \end{Bmatrix} = D_{\tilde{uc}}\hat{d}_{\tilde{uc}} \quad \text{Eq. (A.5)}$$

where the disconnected displacement vector is $\hat{\mathbf{d}}_{\tilde{uc}}$, is made up of displacement scalars/vectors whose superscripts are indices of each type, and subscripts refer to the types of elements comprising the model (i.e., masses or beams). Non-bold elements of Eq. A.5 are scalar quantities, while bold elements are vectors or matrices. Note the first and last mass have a value of $m_1/2$ such that the unit cell is defined symmetrically.

The disconnected displacement vector is linked to the assembled displacement vector of the unit cell as $$\hat{d}_{\tilde{uc}} = L_{uc}\hat{d}_{uc} \quad \text{Eq. (A.6)}$$

Then, the connected dynamic stiffness matrix of the unit cell is $$\hat{f}_{uc} = L_{uc}^t D_{\tilde{uc}} L_{uc}\hat{d}_{uc} = D_{uc}\hat{d}_{uc} \quad \text{Eq. (A.7)}$$

The global dynamic stiffness matrix of the finite PnC, as depicted in FIG. 7A, can be formed by first arranging three unit cells in a disconnected dynamic stiffness matrix form as $$\hat{f}_{\tilde{f}} = \begin{bmatrix} D_{uc}^1 & 0 & 0 \\ 0 & D_{uc}^2 & 0 \\ 0 & 0 & D_{uc}^3 \end{bmatrix} \begin{Bmatrix} \hat{d}_{uc}^1 \\ \hat{d}_{uc}^2 \\ \hat{d}_{uc}^3 \end{Bmatrix} = D_{\tilde{f}} d_{\tilde{f}}, \quad \text{Eq. (A.8)}$$

where superscripts refer to the unit cell indices. The individual unit cell dynamic stiffness matrices are assembled just as the individual beam and rigid masses were assembled to form the unit cell dynamic stiffness matrix. The displacement vector of the assembled finite PSub is related to the displacement vector of the disconnected unit cell system as $$\hat{d}_{\tilde{f}} = L\hat{d}, \quad \text{Eq. (A.9)}$$

where $\hat{d}$ is the displacement vector of the assembled finite PSub, and the associated dynamic stiffness matrix is $D=L^t d_{\tilde{f}} L$. The force vector of the assembled finite PSub system is then defined as $\hat{f}=D\hat{d}$. It should be noted that the primal assembly matrix L, is structured to impose clamped boundary shown in FIG. 7A, by setting the first and last degrees of freedom of the disconnected unit cell system to be equal to zero.

In one or more embodiments shown or described herein, $D=K-\omega^2$, but generally a damping matrix C can be included if necessary, as is done in Eq. (5). Additionally, the same mass, stiffness and damping matrices are used to compute time-domain solutions of the system, such as the FSI modeling procedures used in Section 5.2.

Dispersion Curve Calculation

Methods for calculating the dispersion curves of structure represented by a dynamic stiffness matrix may be widely used. Appropriate Floquet-Bloch boundary conditions impose a phase shift between the nodes located along the boundaries between unit cells, that would act as coupling surfaces in an infinite tessellation of the unit cell model. Floquet-Bloch conditions are imposed on the 1D MIMO PSub unit cell by relating the first and last nodal displacements and forces as $$\hat{d}_{uc}^{N_{uc}} = e^{\iota\kappa}\hat{d}_{uc}^1, \quad \text{Eq. (B.1)}$$

$$\hat{f}_{uc}^{N_{uc}} = -e^{\iota\kappa}\hat{f}_{uc}^1, \quad \text{Eq. (B.2)}$$

where $N_{uc}$ is the number of degrees of freedom in the unit cell, and is the normalized Bloch wavenumber (i.e. product of Bloch wavenumber and unit cell length). These conditions are represented in matrix form by $$\hat{d}_{uc} = \begin{bmatrix} I_{(N_{uc}-1)\times(N_{uc}-1)} \\ e^{\iota\kappa} \;\; 0_{1\times(N_{uc}-2)} \end{bmatrix} \hat{d}_{\breve{uc}} = T\hat{d}_{\breve{uc}} \quad \text{Eq. (B.3)}$$

-continued and $$\hat{f}_{\breve{uc}} = T * \hat{f}_{uc}, \quad \text{Eq. (B.4)}$$

where T(κ) is that matrix that encodes the Floquet-Bloch conditions, subscripts on the matrices indicate their row-column size, and the superscript * is the Hermitian transpose. Thus, $\hat{\mathbf{f}}_{\widetilde{uc}} = T^* D_{uc} \mathbf{T} \hat{\mathbf{d}}_{\widetilde{uc}} = \mathbf{D}_{\widetilde{uc}} \hat{\mathbf{d}}_{\widetilde{uc}}$ . Finally, the dispersion curves can be obtained by solving $\det(\boldsymbol{D}_{\widetilde{uc}}(f, \kappa))=0$ for eigenfrequencies as a function of normalized wavenumber. The dispersion curves plotted in FIG. 7B were generated by this method.

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

Referring to FIG. 13, a potential embodiment of a multi-input, multi-output phononic system 100 is shown. FIG. 13 shows a flow structure 102 including a cavity 103. The flow structure 102 can be, for example, a wing or other rigid horizontal structure. The flow structure 102 may be positioned in a fluid flow 124 with fluid flowing along either or both of a top surface 118 and a bottom surface 120 from a front edge 122 of the flow structure 102.

Inside the cavity 103, multiple masses may be linked together along a flexible beam structure 107 comprising one or more flexible beam segments 108 (denoted individually by an increasing number of apostrophes (') after the number 108—unless an individual segment is specifically referred to, the use of the number "108" refers to each and all of the flexible beam segments 108-108'''''). The flexible beam segments 108 may be rigid, horizontal pieces of flexible material that support the weight of one or more masses at one or both ends of the flexible beams 108. The flexible beams 108 may be coupled to the flow structure 102 or other structure at a forward end 104 and an aft end 106 of the flexible beam structure (i.e., at a forward end of the first flexible beam segment 108 and at an aft end of the sixth flexible beam segment 108'''''). The number of flexible beam segments 108 is not limited to the number shown in the figures and any number of flexible beam segments may be used in embodiments of the phononic system 100. Generally, a mass will be positioned at a forward end of one segment and an aft end of another segment.

In some embodiments, the phononic system 100 includes a first set of masses 110, 110', 110'' (referred to collectively as first set of masses 110 unless specifically referenced in the text), and a second set of masses 112, 112' (referred to collectively as second set of masses unless specifically referenced in the text). The masses 110, 112 may be rigid masses. Each of the masses 110, 110', and 110'' may be of equivalent mass and each of the masses 112, 112' may be of equivalent mass. In embodiments, the masses 110 may be equivalent to or different than the masses 112. As alluded to above, the masses 110 and the masses 112 may be alternatively, individually coupled with one another via the flexible beam segments 108, which may enable relative motion between the masses 110, 112. The masses 110, 112 may be inhibited or prohibited from rotating about a longitudinal axis of the flexible beam structure 107 and/or individual ones of the flexible beams 108. The masses 110, 112 can be cubes or other volumetric shape (e.g., sphere, triangular pyramid, square pyramid, amorphous, etc.) In embodiments, one or more of the masses 110, 112 may be coupled to interface surfaces, such as the first fluid interface 114 and the second fluid interface 116.

The first fluid interface 114 may have a first interface surface 114a and the second fluid interface 116 may have a second interface surface 116a. The interface surfaces 114*a*, 116*a* may each be exposed to the fluid flow 124. The first fluid interface 114 and the second fluid interface 116 may be rigidly coupled to different ones of the masses. For example, the first fluid interface 114 may be rigidly coupled to the mass 110 and the second fluid interface 116 may be rigidly coupled to the mass 110'. Gradients in the velocity, pressure, and other aspects of the fluid flow 124 across the first interface surface 114*a* and the second interface surface 116*a* may cause the first fluid interface 114 and the second fluid interface 116 to move upward or downward. Motion (e.g., cantilevered motion) may be possible based on the flexibility of the flexible beam structure 107. Because the various segments of the flexible beam structure 107 are able to move separately form one another, the first fluid interface 114 and the second fluid interface 116 may move independently of one another, enabling passive flow control using the multi-input, multi-output phononic system based on the principles described herein.

FIGS. 14 and 15 shows an exemplary embodiment of a flow structure 202, which could serve as one embodiment of the flow structure 102 of FIG. 13. FIG. 14 shows the flow structure 202 including a first fluid interface 114 and a second fluid interface 216. The fluid interfaces 214, 216 may be positioned and the flow structure 202 arranged such that fluid flows across the fluid interfaces 214, 216 in a direction substantially parallel to the x-axis of the coordinates 224. The fluid interface 214 may be coupled to a mass 210 and the fluid interface 216 may be coupled to a mass 210'. FIG. 14 shows an embodiment in which a mass 212 precedes the mass 210 along the flow direction, each of the masses 210, 212 linked by a flexible segment 208 (not all of the flexible segments 208 are labeled for clarity). As shown in FIG. 15, the flexible segments 208 can extend between alternating masses in generally opposing directions as shown by the generally opposite directions of segment 208*a*' and segment 208*b*' and segment 208*a*'' and segment 208*b*''. In some embodiments, motion of the masses may be limited to one or more degrees of freedom (e.g., rotation of the masses may be prevented, they may be prevented from moving forward and aft as compared to the flow direction, or other degrees of freedom of movement may be prevented). As shown in FIG. 15, the motion of the mass 212 is limited to translation along an axis (i.e., in the ±z direction) by an axis 236. Other ones of the masses 210, 212 may be similarly constrained using similar means or other types of motion constraints.

FIGS. 16*a* and 16*b* show a phononic system 300 in a flow structure 302. The flow structure 302 includes a leading edge 322, a bottom surface 320, and a top surface 318 with a fixed portion 318*a* and a removable portion 318*b*. The removable portion 318*b* may fit within a cavity 303 of the flow structure 302 and may interface with the flow structure 302 along a rim 350 of the cavity 303. The removable portion 318*b* may include a first slit 315 and a second slit 317. The first slit 315 and the second slit 317 may provide a space for the first fluid interface 314 and the second fluid interface 316 to interact with the fluid flow 324 in contact with the flow structure 302. FIG. 16*a* shows the removable portion of the top surface 318 removed, exposing the phononic system 300. As fluid flows across the flow structure 302, it may interact with the first fluid interface 314 and the second fluid interface 316 based on the principles described herein enabling passive flow control using the multi-input, multi-output phononic system.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A multi-input, multi-output phononic system comprising:

a first interface surface and a second interface surface that respond to at least one of a pressure gradient or a velocity gradient in a wave of a turbulent fluid flow or a laminar fluid flow, the pressure gradient or the velocity gradient associated with complex motion of the flow exhibiting a plurality of frequencies exerted on one or more of the interface surfaces; and a subsurface feature extending from the interface surfaces, the subsurface feature comprising a phononic crystal or locally resonant metamaterial adapted to receive one or more of the pressure gradient or the velocity gradient from the fluid flow via the interface surfaces and to alter one or more of a phase and an amplitude of a plurality of frequency components of the fluid flow, and a plurality of masses linked by a flexible beam structure, wherein the subsurface feature is a homogeneous, uniform elastic structure that couples the first interface surface and the second interface surface, the multi-interface phononic system adapted to receive the wave via the interface surfaces and to alter a phase of the wave, the set of interface surfaces is adapted to vibrate at a frequency, phase, and amplitude in response to the altered phase of the wave, and the rotation of the masses about a longitudinal axis of the flexible beam structure is inhibited.

2. The multi-input, multi-output phononic system of claim 1, wherein the plurality of rigid masses comprises a first set of masses, each of the masses in the first set of masses having an equivalent mass, a second set of masses, each of the masses in the second set of masses having an equivalent mass, wherein individual ones of the first set of masses and individual ones of the second set of masses alternate along the length of the flexible beams.

3. The multi-input, multi-output phononic system of claim 2, wherein the first interface surface is rigidly coupled to a first mass in the first set of masses and the second interface surface is rigidly coupled to a second mass in the first set of masses, and a mass of the second set of masses is coupled between the first mass in the first set of masses and the second mass in the first set of masses.

4. The multi-input, multi-output phononic system of claim 3, wherein interaction between the first interface surface, the second interface surface, and the fluid flow enable a positive phasing.

5. The multi-input, multi-output phononic system of claim 4, wherein the subsurface feature is adapted to reduce kinetic energy within the flow.

6. The multi-input, multi-output phononic system of claim 5, wherein the phononic subsurface feature is adapted to reduce formation or development of an energy cascade characteristic of partially or fully developed turbulence.

7. The multi-input, multi-output phononic system of claim 1, wherein the fluid flows at least partially as a Tollmien-Schlichting (T-S) wave.

8. The multi-input, multi-output phononic system of claim 3, wherein interaction between the first interface surface, the second interface surface, and the fluid flow enable a negative phasing, between the displacement and the forcing induced by the flow, at one or more interaction surfaces.

9. The multi-input, multi-output phononic system of claim 8 wherein the subsurface feature is adapted to increase kinetic energy within the flow.

10. A method of controlling a flow comprising:

providing a first interface surface and a second interface surface in a fluid flow along a flow structure, the fluid flow exhibiting turbulent or laminar flow characteristics, the first interface surface and the second interface surface arranged within the flow structure such that they each are exposed to one or more of a pressure gradient and a velocity gradient associated with complex motion of the fluid flow; and providing a subsurface feature extending from the interface surfaces, the subsurface feature comprising a phononic crystal or locally resonant metamaterial adapted to receive one or more of the pressure gradient or the velocity gradient from the fluid flow via the interface surfaces and to alter one or more of a phase and an amplitude of a plurality of frequency components of the fluid flow;

passively altering one or more of a phase or amplitude of a plurality of frequency components of the flow via the subsurface feature, and vibrating the set of interface surfaces at a phase and amplitude of a plurality of frequency components of the flow, wherein the set of interface surfaces are physically coupled to one or more masses in the subsurface feature, and the masses are tuned such that the interface surfaces vibrate at a plurality of frequencies in response to the pressure and/or velocity gradients of the fluid flow.

11. The method of claim 10, wherein the first interface surface and the second interface surfaces are physically coupled to equivalent masses.

12. The method of claim 11, wherein the equivalent masses physically coupled to the first interface surface and the second interface surface separated by a mass of a different amount than the equivalent masses.

13. The method of claim 10, wherein the first interface surface is upstream of the second interface surface and there is a phase shift between the forcing of the first interface surface and the second interface surface.

14. A system for reducing skin friction of a surface using multi-input, multi-output phononic subsurfaces for passive boundary layer transition delay comprising:

a first interface surface and a second interface surface that respond to at least one of a pressure gradient or a velocity gradient in a wave of a turbulent fluid flow or a laminar fluid flow, the pressure gradient or the velocity gradient associated with complex motion of the fluid flow exhibiting a plurality of frequencies exerted on one or more of the interface surfaces; and a subsurface feature comprising a plurality of masses extending from the interface surfaces, the subsurface feature adapted to receive one or more of the pressure gradient or the velocity gradient from the fluid flow via the interface surfaces and to passively alter one or more of a phase and an amplitude of a plurality of frequency components of the fluid flow, wherein:

the plurality of masses comprises:

a first set of masses comprising a first mass, and a second set of masses comprising a second mass, and the first set and the second set are arranged in an alternating pattern and connected with one another in series via a plurality of flexible segment beams.

15. The system of claim 14, wherein the flexible segment beams are linked to form a flexible beam structure and the flexible beam structure is anchored to a flow structure at a forward end and an aft end and can move perpendicularly in a plane parallel with respect to a direction of fluid flow across the flow structure.

* * * * *